(12) United States Patent
Gallagher

(10) Patent No.: US 7,219,071 B2
(45) Date of Patent: May 15, 2007

(54) ADMINISTERING INCENTIVE AWARD PROGRAM

(76) Inventor: P. Christopher J. Gallagher, 6009 Goshen Rd., Newtown Square, PA (US) 19073

( * ) Notice: Subject to any disclaimer, the term of this patent is extended or adjusted under 35 U.S.C. 154(b) by 611 days.

(21) Appl. No.: 09/912,591

(22) Filed: Jul. 25, 2001

(65) Prior Publication Data

US 2002/0046110 A1    Apr. 18, 2002

Related U.S. Application Data

(60) Provisional application No. 60/220,672, filed on Jul. 25, 2000.

(51) Int. Cl.
*G06Q 30/00* (2006.01)
(52) U.S. Cl. .......................... 705/14; 705/35
(58) Field of Classification Search ................ 705/14, 705/35
See application file for complete search history.

(56) References Cited

U.S. PATENT DOCUMENTS

| | | | |
|---|---|---|---|
| 5,734,838 A * | 3/1998 | Robinson et al. | 705/14 |
| 5,765,141 A | 6/1998 | Spector | 705/14 |
| 5,791,991 A | 8/1998 | Small | |
| 5,875,437 A | 2/1999 | Atkins | |
| 5,970,480 A * | 10/1999 | Kalina | 705/37 |
| 5,991,736 A * | 11/1999 | Ferguson et al. | 705/14 |
| 6,049,778 A | 4/2000 | Walker et al. | 705/14 |
| 6,061,660 A | 5/2000 | Eggleston et al. | |
| 6,070,153 A | 5/2000 | Simpson | |
| 6,119,933 A | 9/2000 | Wong et al. | |
| 6,222,914 B1 | 4/2001 | McMullin | |
| 6,243,688 B1 * | 6/2001 | Kalina | 705/14 |
| 6,292,786 B1 | 9/2001 | Deaton et al. | |
| 6,345,261 B1 | 2/2002 | Feidelson et al. | |
| 6,895,386 B1 * | 5/2005 | Bachman et al. | 705/14 |
| 2004/0083183 A1 * | 4/2004 | Hardesty et al. | 705/65 |

FOREIGN PATENT DOCUMENTS

WO    WO/1998/038562    *    3/1998

OTHER PUBLICATIONS

Michael Markowitz ("Hubco seeks loyalty with discount shares customers offered stock-purchase plan", The Record, Bergen County N.J., Mar. 25, 1999, p. B.01).*
Thrush, Glenn H; "Saving Your Way Into Debt"; New York Times; Oct. 15, 2000; New York, NY.
Stockback Trust; "SEC Form N-1A"; Sep. 16, 1999; www.Stockback.com.

(Continued)

*Primary Examiner*—Eric Stamber
*Assistant Examiner*—John Van Bramer
(74) *Attorney, Agent, or Firm*—Loretta F. Smith

(57) ABSTRACT

Provided are computer based methods and apparatus for carrying out an incentive award program by a business entity, comprising the steps of participating in a transaction having at least two parties, determining at least one of these parties to be an award recipient, and providing the award, wherein the award includes at least one investment chosen from a plurality of vehicles for investment and wherein the business entity may be the owner or an authorized operator of the incentive award program.

109 Claims, 10 Drawing Sheets

OTHER PUBLICATIONS

"The Stockback Fund Prospectus"; Aug. 14, 2000; pp. 1-36; downloaded Dec. 5, 2000 from www.stockback.com.

"Take Stock in Cisco"; pp. 1-3; downloaded Aug. 21, 2000, from www.cisco.com.

"Free IPO"; downloaded from www.freeipo.com; copyright 1997-1999.

www.travelzoo.com; Travelzoo Inc.; refer to SEC Form S-4 filed Feb. 6, 2001.

Bea Systems, Inc.; news release re Stockback ; Aug. 1, 2000.

www.stockback.com; "Redeeming Stockback Help".

www.dreamwater.com; "Free Stocks and Shares"; downloaded Feb. 19, 2001.

www.popularlink.com; Copyright 1996-2000 Popular Link; Copyright 1997-2000 ; powered by Free IPO.com.

Upromise news release; Jan. 22, 2001; downloaded Feb. 6, 2001.

Symonds, William; "Spending Your Kids Into College"; Business Week, Apr. 23, 2001; p. 86. 2p, 1c; Issue 3729.

Gordon, Joanne; "Margin Call"; Forbes; May 14, 2001; pp. 150, 152.

McDonald, Jock (photographs); "The Boom In Employee Ownership"; INC Magazine; Aug. 2000; pp. 106, 108, 110, 112.

www.upromise.com; "Member Agreement"; downloaded May, 30, 2001.

\* cited by examiner

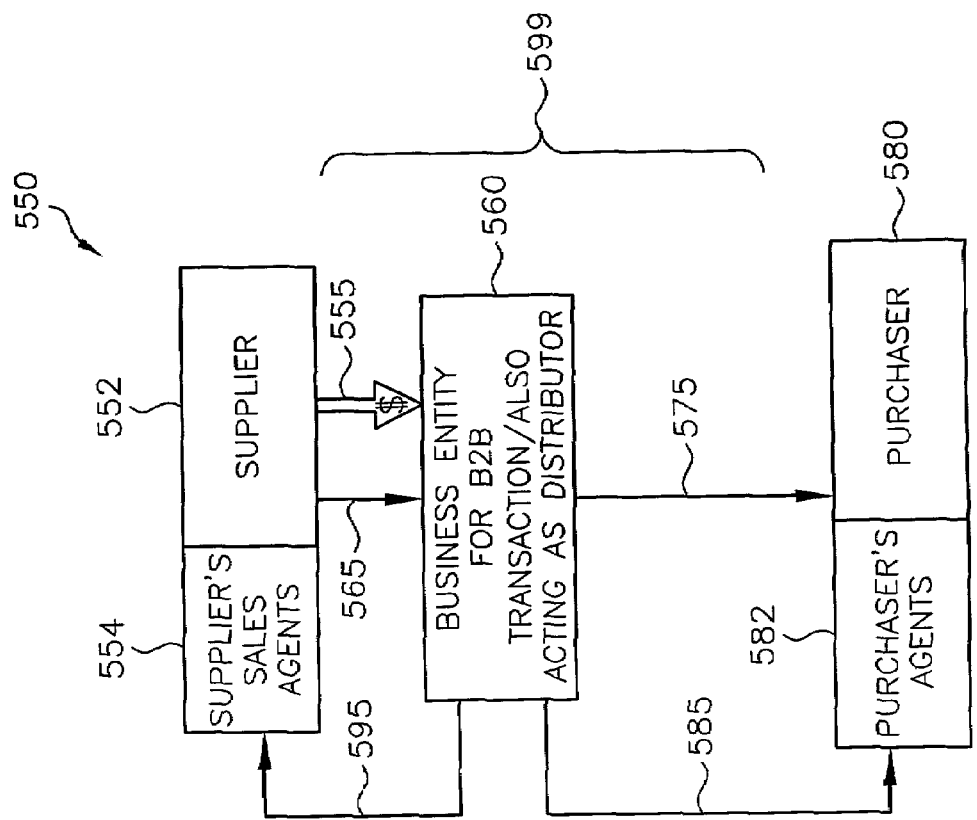
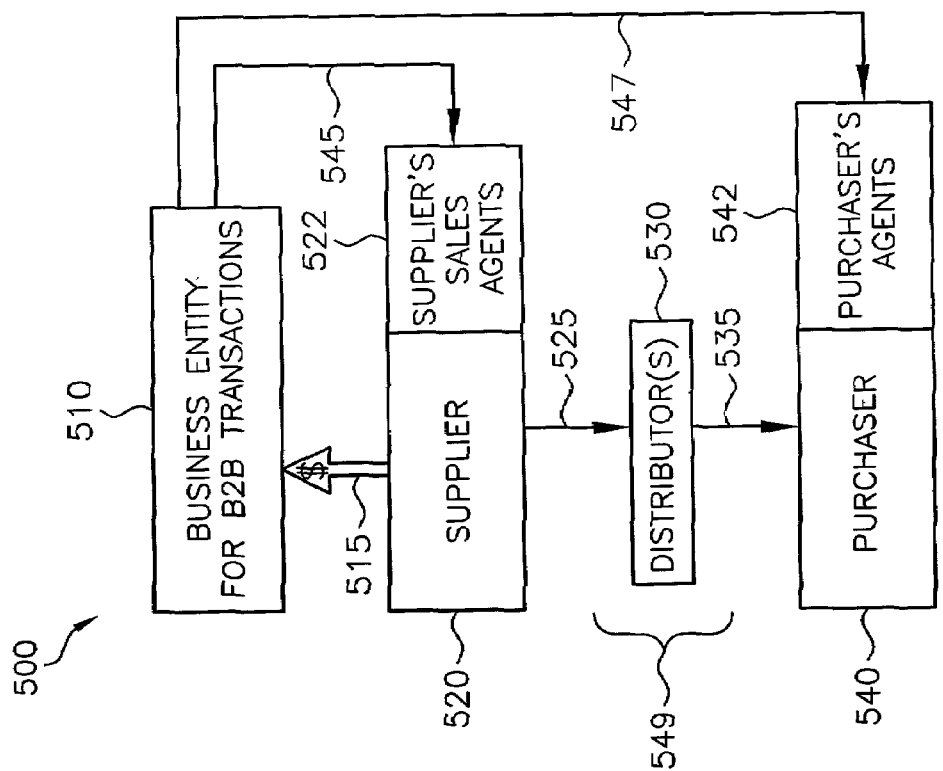
Fig-5B
Fig-5A

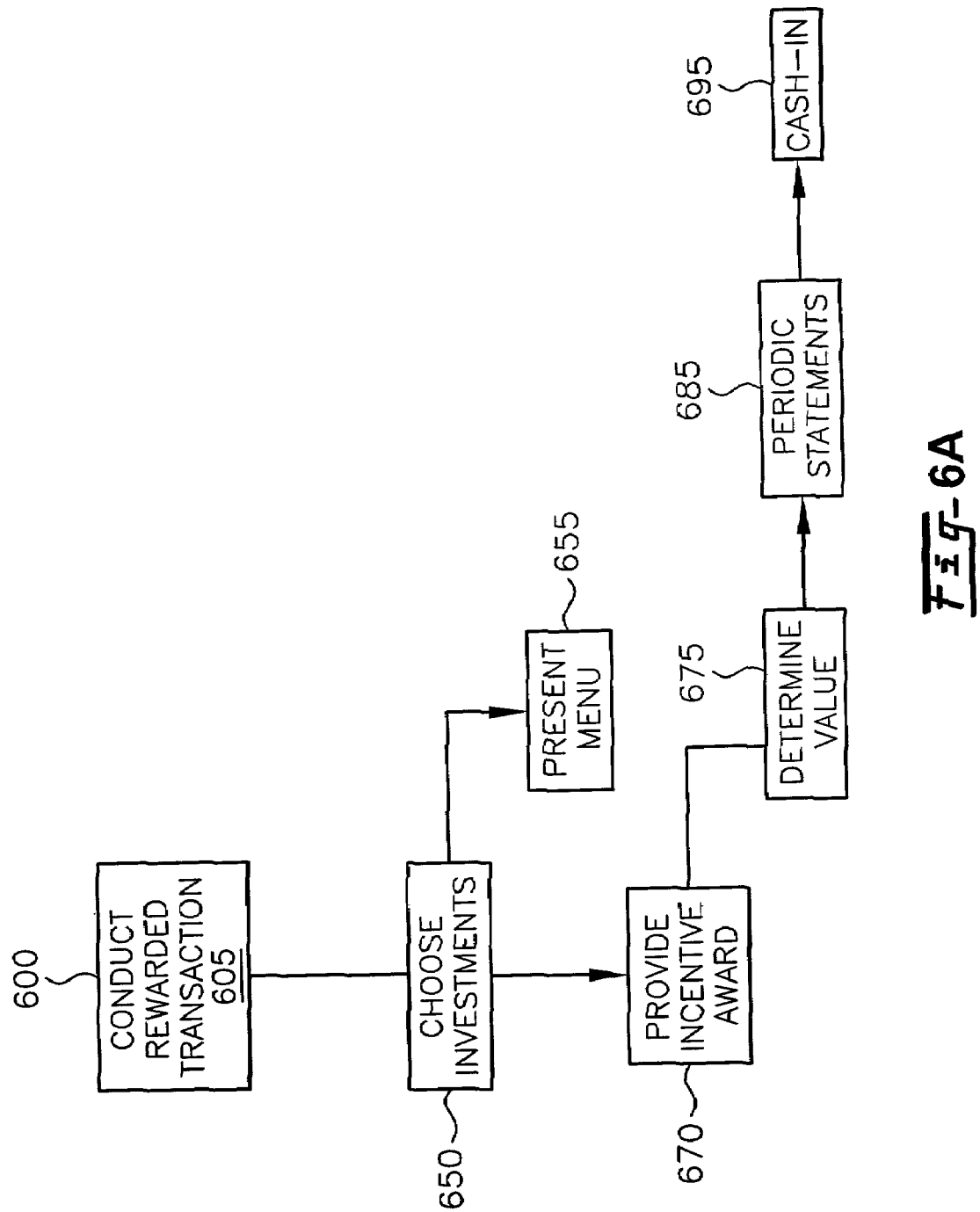

| INVESTMENTS | CODE |
|---|---|
| EQUITY IN PORTAL [1234] | |
| U.S. WORTH OF PORTAL [1234] | |
| MUTUAL FUND, SMALL CAP | |
| STOCK | |
| BOND | |
| MANY OTHER CHOICES OFFERED | |

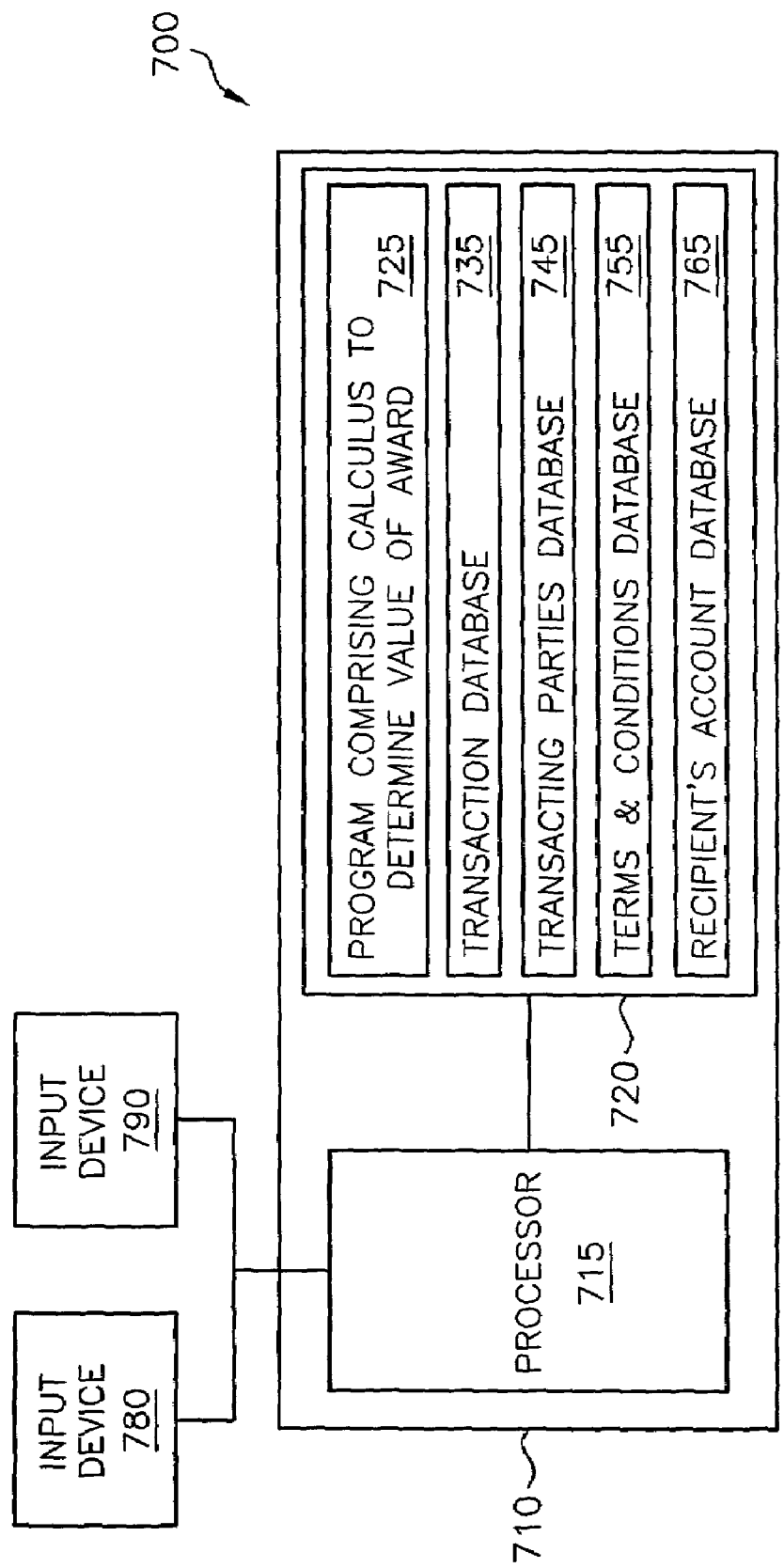

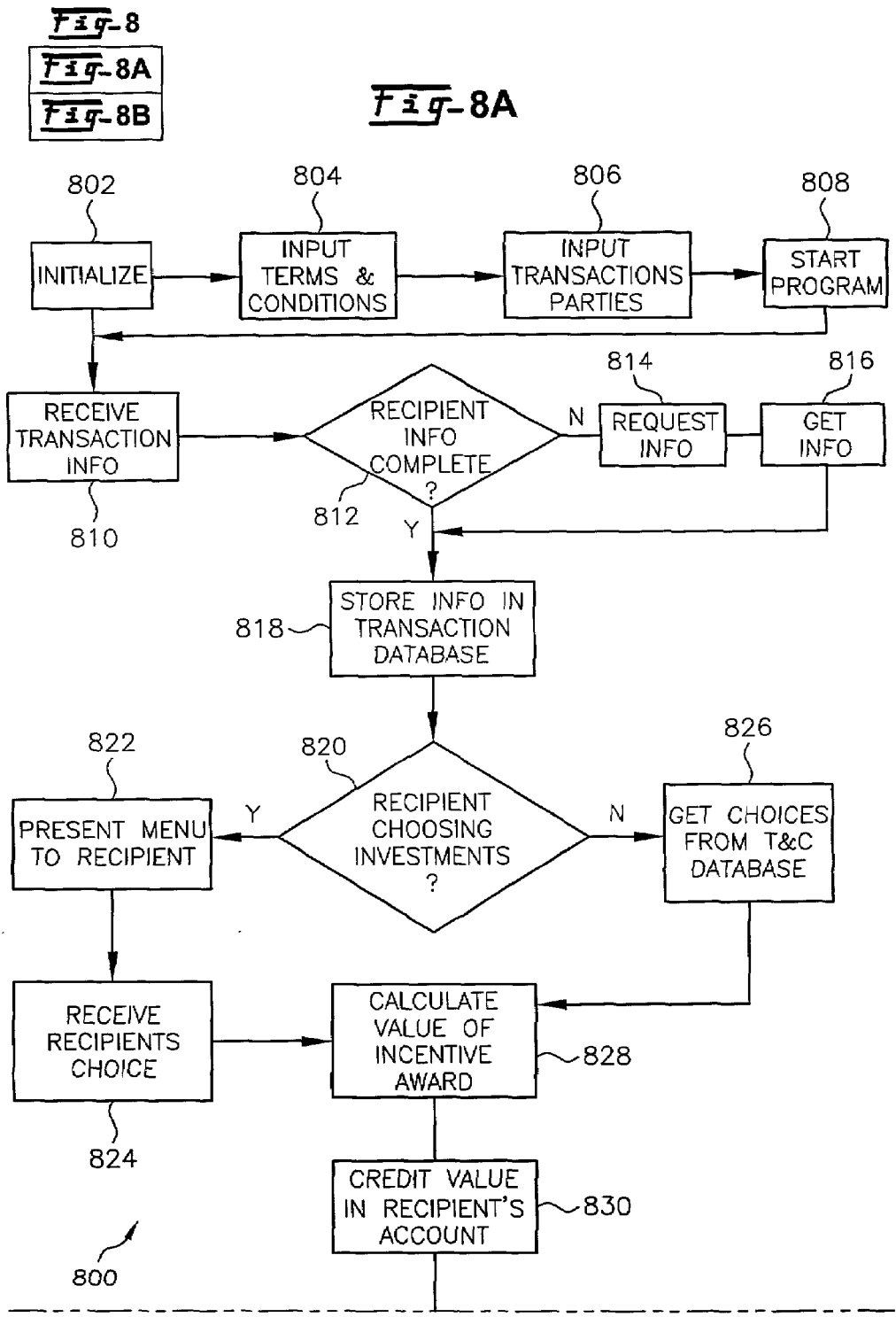

ADMINISTERING INCENTIVE AWARD PROGRAM

CROSS REFERENCE TO RELATED APPLICATION

This application claims the benefit of U.S. Provisional Application No. 60/220,672 filed Jul. 25, 2000.

OVERVIEW

A classic incentive award program is the granting of frequent flyer miles, initially implemented as its name suggests in the narrow application of rewarding airline passengers. The rewards were narrowly defined, also, typically comprising upgrades into first class seats when they were available or a free flight when enough miles had been accumulated. The free flight would usually be granted by the airline on a plane that would otherwise fly with some seats empty.

While the value of frequent flyer incentive awards now exceeds $15 billion annually, the program has a number of drawbacks. In its initial form, it provided incentives to only a relatively small number of people—those traveling by air and, of those, only the minority who did so frequently. The program has gradually expanded in scope, to include rewards granted in 'miles' in return for staying at hotels, renting cars and other, mostly travel-related, expenditures.

A further weakness of the program is that it is offered by many airlines, thereby weakening its ability to generate gains in market share for any single one of them. Further, implementing the reward system has become increasingly difficult. There are simply too many people possessing too many frequent flyer miles for them all to be satisfied in timely fashion with upgrades or free flights. That is, the business model has failed to scale satisfactorily as the program has expanded. Resort is now being made to buying back, and thereby retiring, miles or to allowing purchases with frequent flyer miles from selected catalogs of merchandise.

More widely applied incentive award programs have typically fallen into the broad categories of rebates, discounts or prizes. Discounts are generally provided to each and every participant in a sale or other program while prizes are more commonly received by only a fortunate fraction of the transacting parties. Awards can be in the form of cash, as in a discount or rebate, or in the form of free merchandise when a prize is won. Incentive awards of this type are most frequently granted to individual consumers, for instance by fast food chains, supermarkets in affiliation with their various suppliers, clothing stores and the like, all seeking to encourage spending on their own items of commerce.

A recognizable deficiency in current incentive award programs is that they are applied piecemeal, typically only from time-to-time and in an uncoordinated way by various and sundry individual consumer-oriented vendors. Significant market sectors are at present underserved by award programs, for instance, residential real estate transactions, mortgage and other loan originations and virtually the entire spectrum of business-to-business transactions.

An advance would involve establishing an incentive award program that would be in place on a daily, continuous basis; would be available in a greatly increased number of market sectors; and, would be of a nature that would powerfully attract participants in high value as well as less consequential transactions. A further advance would be to establish a regional and national brand image by establishing a certifying mark for use in advertisements. Prospective transacting parties could thereby readily recognize, indeed, actively seek out, opportunities to receive incentive awards.

A feature of an advanced incentive program would be employment of a business model that recognized that prospective parties to transactions vary, one from another, in what would motivate them to actually transact. Accordingly, a desirable feature would be that a wide range of different types of awards could be available as incentives, tailored to appeal to a wide spectrum of recipients' preferences, yet with a unifying overall theme so as to avoid offering a program that is too unwieldy or complex. A goal would be to offer some awards that appealed to risk-averse prospects and other, riskier but also more exciting awards.

Further features of an advanced incentive program would be its ready ability to satisfy making the awards over an extended period of years, and without regard to how many or how few transacting parties become involved. That is, a feature of an advanced inventive program is the use of a business method having awards of open-ended availability; not, for instance, as seats on airline flights. Ideally, the program would self-adjust, that is, the ongoing ability to disburse valuable incentive awards should as automatically as possible be a built-in feature of the method.

In recent months, an incentive program has been introduced, exclusively for transactions online on the Internet, in which dozens of merchants grant discounts on purchases of products or services. These cash rewards are paid into an account established online for each purchaser. As soon as it is deposited in the account, the customer can elect to withdraw the cash, leave it on deposit in a non-interest-bearing cash account or purchase shares in the single mutual fund that is available. The fund is described as seeking long-term capital appreciation.

Also in recent months, a program has been introduced in which discounts are granted for credit card transactions by consumers with a large number of participating stores, restaurants and the like. The discounts are deposited directly in federally-tax-deferred Type 529 college savings accounts. The program is scheduled to be extended in the fall of 2001 to include discounts granted by participating affiliate companies to transacting parties who buy or sell a home or take out a home mortgage.

These two current developments do not represent an advance in incentive award methods; they provide only a single kind of investment to recipients. Further, only a single category of transacting party, namely the customer, is rewarded in all of the transactions. Also, the single kind of investment available in each program is of a relatively conservative nature not appealing to all prospective customers.

The method and apparatus of the present invention represent significant advances over even the most recently developed programs. Proposed incentive awards comprise vehicles for investment chosen from an extensive menu and ranging from conservative to high risk/high return. It is contemplated that the program will be effective in a wide range of business-to-business transactions as well as business-to-consumer transactions. It provides for the funding of the incentive awards of a single transaction to be from multiple sources and for awards therein to be made to more than one recipient. It further provides for awards to be made in the equity value of entities, including the equity of the program administrator, the equity of participating companies and equity in the form of tracking stock, for instance, in the incentive award program operations of an entity. Accordingly, an award in an equity that reflects operations of the incentive award program allows recipients to participate in the program's performance. Such vehicles for investment diminish the one-to-one dependence between the value of the incentive award and the value of the underlying transaction and instead provide access to the market capitalization value of the awarded equity. The present invention provides for transacting parties to display certifying marks, thereby identifying them as grantors of incentive awards and assisting prospects to locate multiple opportunities to receive chosen vehicles for investment. Yet further provided for are lottery embodiments of the present invention in which prizes can be awarded that are denominated in chosen investment vehicles.

A further element in the present method is that the quantity of dilutive shares issued as incentive awards is carefully controlled. Other investors in these equity vehicles will recognize that the unit value of their shares has little exposure to erosion by dilution. Accordingly the stock price fully reflects the profitability of the underlying operations. A positive feedback system can thereby be generated employing the method and apparatus of the present invention and can thereby provide an ongoing ability to disburse valuable incentive awards as a built-in feature.

Incentive Award Method

The present invention provides methods and apparatus for an incentive award program that represents advancements over current incentive award programs. The present invention provides a computer-based method by which a business entity carries out an incentive award program. The method comprises the steps of the business entity's participating in a quantifiable transaction; determining at least one of the transacting parties to be a recipient of an incentive award, wherein the incentive award comprises at least one investment chosen from a plurality of investment vehicles; and providing the chosen incentive to the recipient. As used herein, the term business entity is that party which carries out the incentive award program. Either the business entity or, in an alternative embodiment, the recipient chooses at least one investment from the offered plurality of investment vehicles as the incentive award.

The method of the present invention can be carried out by the owner of the incentive award program and/or by authorized operators of the program. The authority to practice the method ultimately resides with the owner of the program, who, in some embodiments, contracts with as many authorized operators as desired to practice the method in different market niches and/or in different geographic locations. As used herein, the term business entity is a general term and includes the owner of the incentive award program as well as any authorized operator having authority to practice at least some part of the method in at least one market and/or geographic location.

Except for the owner of the incentive award program, the authority of a business entity to practice the method of the present invention arises from a contract with a business entity already authorized to practice the method. Thus, a business entity can legitimately parcel out its authority to others to practice the method of the present invention. That is, each business entity, whose contractual authority permits, can further contract with other parties to become authorized operators. Moreover, an authorized operator becomes at the same time an additional business entity in its own right inasmuch as its contract with the business entity permits it to carry out the present invention in one of a variety of ways.

In one embodiment of the present invention, one business entity can carry out all of the steps of the present method. In essence, the singular business entity can carry out the award program method in all market niches and in all geographic areas around the globe where the program is practiced.

In other embodiments of the present invention, the singular business entity can authorize others, known as authorized operators, to carry out diverse aspects of the present method. An authorized operator can be authorized to carry out, for example, a predefined subset of the steps of the present method, or the entire method within a particular market of transactions and/or the entire method within a specific geographic location. In this way, a singular business entity can create a more complex and somewhat hierarchically organized arrangement of additional authorized operators involved to a lesser or greater degree in carrying out the steps of the present method.

There is a wide variety of embodiments as to how authorized operators may carry out the present method, limited only by the original authority of the higher-up business entity.

A business entity can grant to an authorized operator a right to practice the present method only to the extent of its original authority. For example, if the business entity is limited to practice the present method in, say, Europe, the authorized operator cannot contract from the business entity to practice in Canada. However, an authorized operator can contract with several business entities so as to acquire separate and diverse rights to carry out the present method in a variety of contexts. Thus, in some embodiments, an authorized operator can separately contract with a first business entity to carry out the present method, say, in Europe, as well as separately contract with a second business entity to carry out the present method in, say, all the markets in Canada, and with a third business entity to carry out the present method in Brazil only for real estate transactions.

The organizational relationships of business entities can become more or less hierarchical relative to each other. That is, a business entity can carve out a portion of its authority to an authorized operator so that a downstream relationship is created between them. For example, possessing authority to carry out the present method throughout North America, a business entity can carve out to an authorized operator the authority to carry out the present method in Canada. A lateral organizational relationship between business entities is also contemplated. Such an embodiment is exemplified by a large financial institution, such as Citigroup, having authority to carry out the present method for all Citibank credit card purchases in the United States. By transferring its authority to carry out the present method to its credit card division, Citibank Credit, Citigroup creates a lateral relationship between it and its subsidiary business entity. The point here is that the present method is not limited to any particular embodiment of business and organizational relationships between business entities. The organizational relationship chart among business entities practicing the present method can take an essentially unlimited variety of forms.

As used herein, a quantifiable transaction is a transaction that has a monetary value that can be calculated. The business entity can provide an incentive award for almost any kind of quantifiable transaction. Some examples of quantifiable transactions include, but are not limited to: affiliate vendor relationship transactions; real estate transactions; large ticket item purchases, such as a car; consumer sales over the Internet; business sales over the Internet through a marketplace exchange; Internet auctions and reverse auctions; leases; lotteries; credit card purchases; smart card purchases; bar coded transactions over a communications network; etc.

A quantifiable transaction upon which an incentive award is based must have at least two transacting parties, one of whom may be the business entity. The present invention provides that any entity involved in the quantifiable transaction can be considered a transacting party. In some embodiments, a transacting party can include both the seller of a product or service as well as the purchaser of the good or service as well as any selling or purchasing agent between the seller and purchaser. In one embodiment, the business entity participates in the quantifiable transaction only by carrying out the present method. In an alternative embodiment, the business entity participates both as the administrator of the incentive award program as well as a transacting party in the transaction, for instance, transacting as a seller or distributor of goods or services.

The business entity determines which transacting parties receive an incentive award, i.e., which transacting parties are recipients of an incentive award for a particular kind of transaction. The business entity determines when more than one transacting party in a transaction is a recipient of an incentive award. This multi-recipient awarding allows the business entity great flexibility in encouraging different transacting parties to engage in a particular kind of transaction. For instance, in a transaction involving the sale of real estate, the business entity can decide to grant incentive awards to the seller's real estate agent, the seller, the buyer as well as the multiple listing service. Awarding several recipients in a single transaction allows the business entity to meet diverse business goals, not just to create "customer loyalty". In the real estate transaction example, awarding incentives to several recipients allows the business entity to motivate the seller's real estate agent, the buyer and the multiple listing service agent to participate in the incentive award program. As a participator, the seller's real estate agent can offer the seller an opportunity to get extra value by selling its real estate through that particular agent. Moreover, by additionally awarding the multiple listing service agent and the buyer, the business entity encourages multiple listing services to participate in the program inasmuch as the multiple listing service can advertise to buyers that purchases made through its service carry incentive awards.

When more than one transacting party in the quantifiable transaction is a recipient of an incentive award, an embodiment provides that the total incentive award for the quantifiable transaction is the sum of all incentive awards provided to each recipient in the transaction. The business entity determines the portion of the total award provided to each recipient.

Becoming a transacting party in a quantifiable transaction depends on how the incentive transaction is carried out and, consequently, occurs in diverse ways. In typical current incentive award programs, for a business-to-consumer transaction the purchasing consumer is a transacting party and so is the supplying vendor. The purchasing consumer pays nothing to become a transacting party whereas the supplying vendor pays a fee to the program administrator. In business-to-consumer transactions involving portable goods and personal services, the present method functions similarly to typical incentive award programs, wherein a supplying vendor pays to the business entity a fixed percentage of the transaction revenue amount to participate in the program. Through such affiliateships, vendors typically conduct transactions that involve incentive awards over the Internet and/or through other communications networks, such as through a credit card, a smart card, and/or a debit card network and the like.

In other business-to-consumer transactions of the present method involving, for example, the transfer of real property rights, the purchase of a large ticket item, such as a car or boat, or the procurement of a mortgage or a small business loan, the supplying entity becomes a transacting party and pays a fee to the business entity to participate in the incentive award program, which fee is not necessarily a fixed percentage. Additionally, in a real estate transaction, any number of commercial entities can pay a fee to become a transacting party, including the real estate agent for the seller, the real estate agent finding the buyer, the real estate agency listing the property, the multiple listing service provider, the real estate agency with which the buyer's agent is affiliated, etc. Similarly, in a vehicle sale, any number of commercial entities can pay a fee to become a transacting party, including, for example, the distributor of the vehicle dealerships in a region as well as individual dealerships. In financial transactions, banks, insurance agencies, and credit card companies, for example, may pay a fee to become a transacting party. These examples of fee-paying transacting parties are by no means exhaustive. For instance, fast-food chains, such as McDonald's and Burger King, as well as gasoline companies, such as ExxonMobil, Texaco, etc. could participate as transacting parties by paying a fee to the business entity. In short, any supplying vendor, commercial distributor and/or purchaser, or indeed any commercial entity becomes a transacting party by paying some form of a fee to the business entity. The particulars of this fee are tailored to the transaction but the amount is not necessarily a percentage of the transaction revenue.

Another way a supplying or purchasing vendor becomes a transacting party in a transaction that is rewarded by the present invention is to become a licensee to the business entity, i.e., an authorized operator of the present method, as discussed above.

To summarize about business-to-consumer transactions, in the present method consumers do not pay to become transacting parties. The present method thus can build consumer loyalty as other incentive programs do. The present invention typically relies on at least one commercial transacting party to pay a fee of one kind or another, in order to fund incentive awards for at least one recipient per transaction.

The business entity determines which of the transacting parties or their agents are recipients of the incentive award. In business-to-business transactions as in business-to-consumer transactions, the present method allows several parties in the transaction to be recipients. And this multiple-recipient awarding of the present invention strongly fosters vendor participation in the incentive award program of the present invention.

To illustrate this point, consider the example of an auto parts Internet exchange. By paying fees to the business entity, parts manufacturers, distributors and car manufacturers can be in a position to negotiate with the business entity as to which transacting parties will receive incentive awards. An auto manufacturer, say General Motors, can designate as award recipients those of its purchasing agents who consistently execute the most cost-effective deals. Likewise, the automobile parts distributor can opt to reward its distributing agents who broker the greatest number of deals. In this way, one multiple-recipient transaction serves to encourage separate and distinct business goals for different commercial parties—increased sales and reduced cost—while simultaneously working to expand the incentive award program. That is, non-participating companies can be encouraged to participate in the incentive award program because of the reward these companies can thereby provide employees and agents. The greater the number of participating transacting parties, the greater revenue the business entity takes in from collected fees. The business entity itself can be desirous of entering certain markets and can choose to accept transacting parties that do not pay it fees. The greater the revenue of the business entity, the larger the incentive awards provided to recipients and the more diverse the offered investments. In turn, the greater the provided awards, the more companies are likely to participate because of the increased value to selected employees.

Each recipient may designate at least one other party to receive at least a part of that recipient's incentive award. The present invention therefore offers recipients the opportunity to give their incentive awards, including the chosen investments, to third party beneficiaries, which may be any entity. In practical terms, the present invention promotes, for example, philanthropic giving to non-profit organizations of the recipient's choice as well as the creation of general or special purpose trust finds for dependents.

The incentive award of the present invention comprises at least one investment chosen from a plurality of vehicles for investment. The term vehicle for investment (or investment vehicle) means a type of investment. The plurality of vehicles for investment operates as a menu of investments that the business entity chooses to draw up and includes any combination of the following investment vehicles: money market funds, bonds, equities, mutual funds, corporate bonds, government bonds, value of entities in which the business entity cannot issue instruments of ownership leading to dilution of the unit value of previously issued instruments, options, warrants, restricted stock, shares, shares of tracking stock, municipal bonds and value of entities in which the business entity can issue instruments of ownership leading to dilution of the unit value of previously issued instruments. In an embodiment of the present invention, the plurality of vehicles for investment comprises a set of investments having a range in degree of speculative risk from a minimal degree to a maximal degree. Minimal degree risk investments include those that carry little or almost no risk, such as bank accounts or certificates of deposit. Maximal degree risk investments include those that bear a great potential for substantial gain and/or loss.

In one embodiment, the business entity selecting the offered plurality of investment vehicles is the owner of the present method. In another embodiment, the business entity selecting the offered plurality of investment vehicles is the authorized operator carrying out the present method in the market of quantifiable transactions from which the incentive award springs. In a further embodiment, the offered plurality of investment vehicles is selected by both the owner of the present method and at least one authorized operator. In all these embodiments, the selecting business entities can include in the offered plurality of investment vehicles at least one investment in which a business entity can issue instruments of ownership that lead to dilution of the unit value of previously issued instruments. For example, if ExxonMobil is an authorized operator of the present method in the gasoline market niche, then ExxonMobil can offer as an incentive award ExxonMobil common or preferred stock or options or warrants to buy ExxonMobil stock as at least one of the investments selectable from the offered plurality of investment vehicles.

As discussed above, the present method admits the incentive award to be valued in ways other than as merely a percentage of the monetary value of the rewarded transaction. That is, the present method does not necessarily adopt a ratio relationship between the monetary value of the rewarded transaction and the value of the incentive award flowing from it. Because the capital that funds the incentive award program arises not only from a discount or rebate originating from the vendor or supplier of the rewarded transaction, but also from fees paid by a variety of commercial transacting parties in one transaction, the business entity can rank the award value of different transactions. In one embodiment, the value of the incentive award gets larger as the value of the quantifiable transaction gets larger. In another embodiment, the business entity provides a larger incentive award when at least two of the following measures are present: a certain profitability of the transaction to the business entity, the total revenue amount of the transaction and at least one parameter indicative of geographical location related to the transaction. The presence of these measures signals to the business entity that the transaction has a relatively greater value.

A further embodiment regarding the value of the incentive award occurs when the award includes an investment in which the business entity can issue as the incentive award dilutive instruments of ownership in its own value or in that of a related company, such as a subsidiary. Dilutive instruments of ownership as used herein are instruments selected from the group consisting of shares, restricted stock, options, or warrants that by their issuance lead to dilution of unit value of previously issued instruments. For instance, issuing 5% more share will tend to reduce the unit value of previously issued shares by 5%, and the market capitalization value will tend to remain unchanged.

In one embodiment, when the incentive award is an investment in dilutive instruments of ownership in the value of the business entity, the value of the incentive award is based upon the value of a recipient's transaction occurring within a predefined period relative to the total value of all transactions for which incentive awards were awarded during that period. In another embodiment, when the business entity can issue dilutive instruments of ownership, the value of the incentive award is based 1) upon a percentage of the value of the quantifiable transaction, which percentage ratio remains in effect for a predefined period of time, and 2) on at least two measures of the transaction being more valuable to the business entity, selected from the profitability of the transaction to the business entity, the transaction's total revenue amount and at least one parameter indicative of geographical location related to the transaction. When at least two of these measures are present, a relatively larger incentive award is provided.

Another embodiment when the business entity can issue dilutive instruments of ownership in its own value is that the value of the incentive award is based upon a percentage of the value of the awarded transaction that is applicable during a predefined initial period of operation of the incentive award program. In this embodiment, the value of the incentive award is larger during an initial period of operation of the incentive award program than during subsequent periods. Thus, early participators of the program receive larger incentive awards than later participators.

A further embodiment when the business entity can issue dilutive ownership rights is that a sum of progressively smaller incentive awards provided over all of the periods of operation of the incentive award program asymptotically approaches a limit that represents the total incentive awards provided for all quantifiable transactions.

As discussed above, the present invention comprises several advancements over prior and current incentive award program methods. One such advancement is the fact that the incentive award is chosen from a plurality of investment vehicles. In one embodiment of the present invention, the business entity chooses at least one investment from the offered plurality of investment vehicles. In an alternative embodiment, the recipient chooses the incentive award as at least one investment from the offered plurality of vehicles for investment. Also contemplated is an embodiment in which the business entity chooses at least one investment and the recipient chooses at least one investment so that together the chosen investments comprise the total incentive award. Another embodiment is that the incentive award comprises at least one investment chosen from a plurality of vehicles for investment and providing at least one transacting party a chance to win at least one prize in a lottery.

In embodiments in which the recipient chooses the incentive award, the step of choosing further comprises the recipient being invited to choose at least one investment from a plurality of investment vehicles as the incentive award. The recipient then identifies to the business entity through any appropriate means the chosen investment(s).

Once chosen, the award is provided. The business entity may retain the administrative function of providing the award or alternatively, as discussed above, contract with an authorized operator to execute the providing of the incentive awards. The business entity or authorized operator receives funding to operate the incentive award program. Funding comprises, for example, a per-transaction fee or a more general participation fee. Other kinds of fees include licensing fees paid by authorized operators to practice the method, either in whole or in part, in a designated market. The fee may compensate for conducting all or a subset of transactions within a defined geographical area, such as Mexico, Europe, the Southwest of the United States, etc. Moreover, the fee may pay for the right to conduct transactions in a medium of commerce, such as over the Internet, or through a financial institution or credit card company network, e.g. a debit card, an American Express card and the like. The fee may also be charged solely to defray the program administrator's operating costs of the incentive award program or act as a periodic maintenance compensation.

Generally, commercial transacting parties are the parties assessed fees. The method also contemplates that non-transacting parties may pay fees, as can be the case with an authorized operator that does not engage in quantifiable transactions itself but pays a licensing fee to a higher-up business entity for the rights to practice the method. The business entity itself can be a fee-paying party.

In determining the amount of the incentive award to be provided, a first consideration is whether the chosen award is in an investment vehicle in which the business entity can issue instruments of ownership that lead to dilution of previously issued shares. The present invention contemplates that the business entity actually providing the incentive award can issue instruments of ownership, for instance, shares, in its own equity value or in the equity value of any entity in which the business entity can likewise issue dilutive instruments of ownership. Said equity value typically comprises the market capitalization of the entity, namely the sum calculated by multiplying the unit value of said shares as listed on a stock exchange by the number of the shares outstanding.

By way of illustration, say the owner of the incentive award program is an independent company that has issued shares of stock trading on a stock exchange. Further, say that Citigroup is an authorized operator licensed in the sector of finance transactions but does not execute the providing of the award. One of the investments Citigroup offers as the incentive award can be shares in the value of the owner of the incentive award program as well as its own shares.

If the chosen investment vehicle for an incentive award is not an entity in which the business entity can issue dilutive instruments of ownership, then the step of providing the incentive award is a relatively simple affair. In this embodiment, the business entity generally uses a portion of its funding from received fees to pay for the chosen investment and credits this payment to an account it has created for the recipient.

If the providing business entity can issue dilutive instruments of ownership, then the business entity determines the amount of the chosen investment, for instance a number of shares of stock, and then credits the shares to the recipient's account. Also, in this embodiment, the business entity may additionally estimate a monetary value of the shares it has credited to recipient's account. The business entity does so by multiplying the number of shares credited to the recipient's account by the unit value of the shares on a predetermined date. In a further embodiment, when the shares credited to the recipient's account may also be listed on a stock exchange and publicly traded, as in the example used above with Citigroup shares, the business entity can use the stock exchange value of the shares on the predetermined date to estimate the monetary values of the credited shares in recipient's account.

Once the value of the provided award has been determined, the award may be cashed-in. In one embodiment, the award must be cashed-in within a predetermined period after the lapse of a predefined duration. Otherwise, the award expires worthless. This embodiment of cashing-in applies equally to incentive awards that comprise any kind of investment vehicle. In this embodiment, then, regardless of whether the incentive award is a mutual fund account managed by, for example, Vanguard or a block of shares in the business entity, the incentive award must be converted to cash within, for example, the first two months after the fifth year anniversary of the granting of the incentive award. That is, the investment must be held for a defined duration and then cashed-in within a predefined window of opportunity. The business entity can establish both the duration period of incentive retention, and the window period, as well as the specific cashing-date within the window period. In an alternative embodiment, the recipient selects the specific cashing-in date within the window period.

When the incentive award is in an investment in the worth of an entity in which the business entity can issue dilutive instruments of ownership, the step of cashing-in can further include the steps of issuing shares in the value of the entity and selling these shares, for instance, through a private placement or in trades on the stock market. The selling of these shares typically leads to dilution of any previously issued shares in the value of the entity and secures funding to cash-in the incentive award, whereby the monetary value of the award is ascertained with certainty. The business entity then conveys to the recipient the ascertained value and deducts that value from the credited balance in the recipient's account.

Variations of the Incentive Award Method

To this point, the overview sets forth a generalized set of steps of the incentive award method as well as a description of various embodiments for practicing these general steps. The following is a description of several variations of the overall basic method.

One variation is to practice the general method through an Internet portal site. In this embodiment, the quantifiable transactions are transacted over the Internet through an Internet portal site maintained by or for the business entity. The transactions can be conducted either directly at the portal site of the business entity or in another embodiment at an incentive award web site maintained by or for a transacting party. In one embodiment, these incentive award web sites are accessed exclusively from the business entity's web site either by linking to them from the Internet portal or by entering an intranet or extranet from the Internet portal or through a proxy server.

An incentive award web site is an Internet site addressed as a URL and accessible using a computer, into which a browser has been downloaded, and an internet access connection. The incentive award website can be, for example, a commercial transacting party's website through which it conducts on-line business. The defining characteristic of an incentive award web site is that at least one kind of quantifiable transaction is conducted there involving a recipient of an incentive award comprising at least one investment chosen from a plurality of vehicles for investment. In other words, incentive award websites are sites where rewarded Internet transactions are conducted.

In a further embodiment of the Internet variation of the present method, the business entity or authorized operator hosts, operates or has maintained an incentive award web site. This embodiment reinforces the idea that the business entity can also participate in the Internet version of the method both as a commercial transacting party and as administrator of the incentive award program.

Regarding the investments included in the plurality of vehicles for investment in the Internet practice of the present method, the business entity can offer an investment in the value of the Internet portal web site. The business entity can also offer an investment in its own value or in any investment vehicle in which it chooses to provide the incentive award.

Another variation for practicing the incentive award method of the present invention occurs when the business entity carries out the incentive award program over a communications network. In this embodiment, quantifiable transactions are conducted using a communication means, such as an electronic means, a telephonic means, a wireless means, a general pocket radio service means, a VMTS means or an optical fiber means. The quantifiable transactions include credit transactions, credit card transactions, debit transactions, debit card transactions, smart card transactions, wire transfer transactions, line of credit transactions, Internet transactions, auctions, reverse auctions and lotteries. This embodiment includes those Internet quantifiable transactions that are conducted over wireless networks, such as from wireless telephones, hand-held devices, or hand-held computers.

Examples of rewarded quantifiable transactions over a communication network include banking transactions at an Automated Teller Machine (ATM); all manner of consumer purchases at, for example, a supermarket, mall, gas pump, fast food restaurant or vending machine using a credit card, debit card, smart card or telephone card to pay; commercial transactions involving letters of credit and wire transfers conducted over a financial institution's network or over the telephone; transactions conducted over the telephone in which the purchasing data is input by voice and then keyed into a network database by an operator; and those in which the purchasing data is electronically keyed in from the telephone number pad. Other examples of rewarded quantifiable transactions conducted over a communications network include gambling transactions, such as legalized off-track betting in which credit, debit, telephone, or smart cards and the like are used to pay for the wager, and casino bets, in which the debt is paid through a credit, debit or telephone card network and/or through wire transfers of funds conducted through the communications network of a financial institution. Also contemplated are purchases of chances to win in state or municipal lotteries, as well as transactions conducted at auctions or reverse auctions, paid for by credit, debit, telephone, or smart cards and the like.

A further variation in practicing the incentive award method is to display at least one certifying mark to identify the incentive award program. The certifying mark imparts brand recognition by identifying the incentive award program as rewarding a recipient with at least one investment chosen from a plurality of investment vehicles. In this embodiment, the business entity can grant to a transacting party a right to use the certifying mark, whereby the mark identifies that party's quantifiable transactions as providing incentive awards of the present method.

The certifying mark comprises two components. The first identifies the incentive award method and can be present in all descriptions and uses of the method, for instance, in advertisements and signs. Its purpose is to provide easily recognizable evidence of the presence of the incentive method of the present invention. It can serve a unifying function, for instance by its presence in an advertisement listing numerous and otherwise diverse market sectors and authorized operators. The second component identifies uniquely each specific business entity/authorized operator which offers the incentive method. The certifying mark may also be displayed on the Internet portal site of the business entity operating, hosting or maintaining the site and serves the same identifying functions.

In a further embodiment, the certifying mark may also uniquely identify the incentive award web sites operated, hosted and/or maintained by fee-paying transacting parties to which the Internet portal site provides exclusive access. In a still further embodiment, the business entity grants a right to use the certifying mark to a transacting party who operates at least one incentive award web site. The certifying mark, in this instance, identifies the transacting party as an entity whose quantifiable transactions provide recipients with incentive awards.

Another variation in practicing the general steps of the present method is a lottery variation, in which the business entity provides at least one recipient in the transaction a chance to win at least one prize in a lottery as an incentive award. Another embodiment is that the business entity can also incorporate a pre-existing lottery offered by a transacting party into the incentive award program. That is, the business entity structures the incentive award to include the lottery prize offered by the transacting party. In this way, the lottery prize includes or is exclusively an investment chosen from a plurality of vehicles for investment. In one embodiment of the lottery variation, the incentive award comprises both an investment to be chosen from a plurality of investment vehicles as well as a chance to win at least one prize in a lottery, which can or not include at least one chosen investment. In another embodiment of this variation, the incentive award is provided solely as a prize in a lottery, which includes at least one chosen investment.

The lottery variation of the present method includes the quite common situation when a number of prizes can be won, ranging from very small to very large in value. A very large prize would typically be awarded in a chosen vehicle for investment. It could amount to many thousands of shares in a chosen vehicle for investment. Small prizes, possibly worth less than the unit value of even the smallest chosen vehicle for investment, could be provided quite possibly at a check-out counter where they have been determined to have been won, as the monetary equivalent of the fractional unit value of, say, the smallest chosen vehicle.

The lottery variation can be practiced as an Internet embodiment. That is, the business entity carries out through an Internet portal site the incentive award method in which a chance to win at least one prize in a lottery is provided and the prizes include at least one chosen investment. In this embodiment it is also contemplated that the transactions carrying the chance to win a lottery prize are conducted over the Internet. For Internet lotteries, the business entity can provide incentive awards that comprise combinations of cash and chosen investments. Alternatively, the business entity can restructure a cash lottery prize offered by a transacting party to include a chosen investment. Further, in the Internet lottery variation of the present method, a transacting party can be operating, hosting and/or maintaining an incentive award web site through which it conducts rewarded transactions. These web sites can be accessible to Internet users either directly or by linking through from an Internet portal of a business entity. Linking-through, as used here, includes a variety of ways well-known in the art for restricting an Internet user's access to a web site and includes a link, an intranet, an extranet, proxy server, and the like.

In the lottery variation of the present method, whether or not carried out through the Internet, the chance to win is in proportion to a value of the quantifiable transaction. The value of the transaction is determined by the business entity. In the lottery variation, as in all other variations of the present method, a certifying mark can comprise two components. The first identifies the incentive award method and can be present in all descriptions and uses of the method, for instance, in advertisements and signs. Its purpose is to provide easily recognizable evidence of the presence of the incentive method of the present invention. It can serve a unifying function, for instance by its presence in an advertisement listing numerous and otherwise diverse market sectors and authorized operators. The second component identifies uniquely each specific business entity/authorized operator which offers the incentive method and can serve to identify incentive award web sites.

The present invention also comprises an implementing method that is executed using a computer processor and a computer memory storage device and comprises the following steps:

inputting into the storage device terms and conditions for providing for an incentive award for each of a plurality of quantifiable transactions;

receiving signals representing data descriptive of a quantifiable transaction in which an incentive award is offered;

determining at least one recipient of the incentive award;

transmitting and receiving signals representing data indicative of choosing the incentive award, wherein the incentive award comprises at lest one investment chosen from a plurality of vehicles for investment;

providing the incentive award; and cashing-in the incentive award.

As in the incentive award method, the business entity that carries out the implementing method is either the owner of the incentive award program or an authorized operator. Moreover, a business entity can contract with another party to perform the actual implementing steps. Such other party is an authorized operator. In the implementing method, an authorized operator can be a business entity in its own right, i.e., having authority to practice the incentive award method, as well as have authority to practice the steps of the implementing method as well. Alternatively, in the implementing method, an authorized operator need not have authority to practice the incentive award method i.e., by collecting fees from commercial transacting parties and providing incentive awards, but may only be the business entity's agent for implementing the computer-executed steps of the incentive award method.

As used herein, the logic for providing an incentive award includes both terms and conditions and a calculus for determining the value of the incentive award for each kind of rewarded transaction. The terms and conditions comprise the distinct set of variables used to calculate the valve of the incentive award for a specific kind of transaction. Generally, most calculations of the value of the incentive award include the following terms and conditions: the revenue amount of the quantifiable transaction, the potential choices of investments for each transaction and the fee paid by such parties as pay fees in the quantifiable transaction. Other variables used to determine the value of the incentive award include: parameters by which the business entity assigns a value of the rewarded quantifiable transaction, such as profitability of the transaction and at least one parameter indicative of geographical location related to the transaction; whether a dilutive investment in the value of a vehicle for investment has been chosen; and the selected date of the cashing-in award.

The calculus comprises at least one equation that defines the mathematical and logical relationships among the predefined set of terms and conditions for each kind of rewarded transaction. The terms and conditions for each kind of transaction are stored in a database in a computer memory storage device. The calculus for each kind of transaction can reside in a software program stored also in a computer memory storage device. Thus, to determine a value of the incentive award for a particular transaction, the software program having the appropriate calculus is run, the appropriate values of terms and conditions are selected from the stored database and used in the appropriate equation(s). The specific terms and conditions as well as the calculus used for each transaction can be any the business entity chooses.

As used herein, the term 'data descriptive of a quantifiable transaction' includes any information that identifies the transaction, the parties to it, its terms and conditions and its specific calculus for determining a value for the incentive award. Such data typically include, but are not limited to, the names and contact information of the transacting parties, which transacting, non-transacting or business entity parties are fee-paying, what their fees are, the revenue amount of the transaction, the kind of transaction, the date and location of the transaction, which transacting parties have opted for predetermined recipients, etc. As used herein, the term 'data indicative of choosing the incentive award' includes but is not limited to the names and contact information of the recipients of the award, the kind of transaction, the transacting parties, the date of the transaction, the names and contact information of the beneficiaries, the offered plurality of investment vehicles for the transaction, the chosen set of investments, whether the transaction was conducted through the business entity's Internet portal and/or from an incentive award web site, whether the incentive award arises from a lottery, etc. In the implementation method, receiving and/or transmitting signals indicative of data involves the use of a data input device and a computer processor which can be connected to a communications network, including the Internet. A data input device includes computers, network terminals, hand-held devices, point-of-sale [POS] terminals, such as a cash register with a credit card reader, a smart-card reader, bank card reader and/or a telephone card reader, an automatic teller machine [ATM] and the like. Another embodiment of a data input device is a telephone, used in conjunction with a touch- or voice-activated automated input system, to which the computer is connected.

In the implementation method, the business entity, authorized operator or their agents decide upon the terms and conditions and calculus to be used for each kind of rewarded quantifiable transaction, which are input into at least one storage device connected to at least one computer. By using data descriptive of a rewarded quantifiable transaction received by the business entity, authorized operator or their agents, at least one recipient of the incentive award is determined. The recipients are determined by analyzing the input data descriptive of the quantifiable transaction using the stored logic specific for that transaction. In addition to performing other operations, this analysis identifies which party—the business entity, authorized operator, their agents or the recipients—chooses the investments from the plurality of investment vehicles.

In the embodiment in which the business entity chooses the investments to be provided as the incentive award, signals representing data indicative of the business entity's choosing the incentive award are transmitted to the recipient and/or the appropriate transacting party. In the embodiment in which it is the recipient choosing the incentive award, signals are transmitted to the recipient, a subset of which represent notice to the recipient of the recipient's eligibility to choose as the incentive award at least one investment from a plurality of vehicles for investment. A subset of these transmitted signals represent data indicative of the offered plurality of investment vehicles. Also in this embodiment, the business entity receives signals representing data indicative of the recipient's choice of at least one investment from the offered plurality of investment vehicles.

Regardless of which party chooses the investments as the incentive award, the signals representing the data indicating the choice of investments are processed using the stored logic to result in a calculated value of the incentive award. The calculated result is stored in a database in the storage device so that an account for the recipient is created in the database. Providing the incentive award occurs when the value of the award is calculated and credited to the recipient's account and continues for the duration before the award is cashed-in. During the providing period, signals are periodically transmitted to the recipient, which represent data descriptive of a periodic statement of the recipient's account.

In the implementation method, cashing-in the incentive award includes several embodiments, depending on the kind of investments chosen. Common to all cashing-in embodiments is the step of determining from the stored logic whether the incentive award includes an investment in the value of an entity in which the business entity can issue instruments of ownership that lead to dilution of previously issued instruments. A second common step is determining from the stored logic and stored calculated result that a balance in the account is eligible to be disbursed. If so, the monetary value of the balance is conveyed to the recipient.

When it has been determined that the incentive award includes an investment in which the business entity can issue dilutive instruments of ownership and a balance is eligible to be disbursed, cashing-in a recipient's award causes the business entity to issue shares either in its value or in the value of any entity in which it can issue dilutive instruments of ownership. The newly issued shares are sold, and the monetary value of the sold shares is conveyed to the recipient.

In addition to the above methods, the present invention provides an apparatus for carrying out an incentive award program wherein at least one investment is chosen from a plurality of investment vehicles. The apparatus comprises a computer memory storage device and a computer processor. The processor can be connected to the storage device in one of a variety of ways: directly, remotely, through a communications network. The storage device stores a program for controlling the processor, which performs, according to the program, the steps of the methods described above. The processor performs both the incentive award method and the implementation methods in accordance with the program instructions.

The present apparatus performs the general embodiment of the incentive award method as well as the embodiments of that method that use a communications network or are conducted through an Internet portal that incorporate an identifying certifying mark, and that include a lottery prize as the incentive award, all of which are described above. The present invention performs the steps of the implementation method also described above.

BRIEF DESCRIPTION OF THE DRAWINGS

FIG. 5 is a schematic illustration of a business to business transaction of the incentive award method, involving vehicle transactions.

FIG. 7 is a schematic illustration of an embodiment of the incentive award method carried out from an Internet Portal Site.

DETAILED DESCRIPTION

Figure 1:
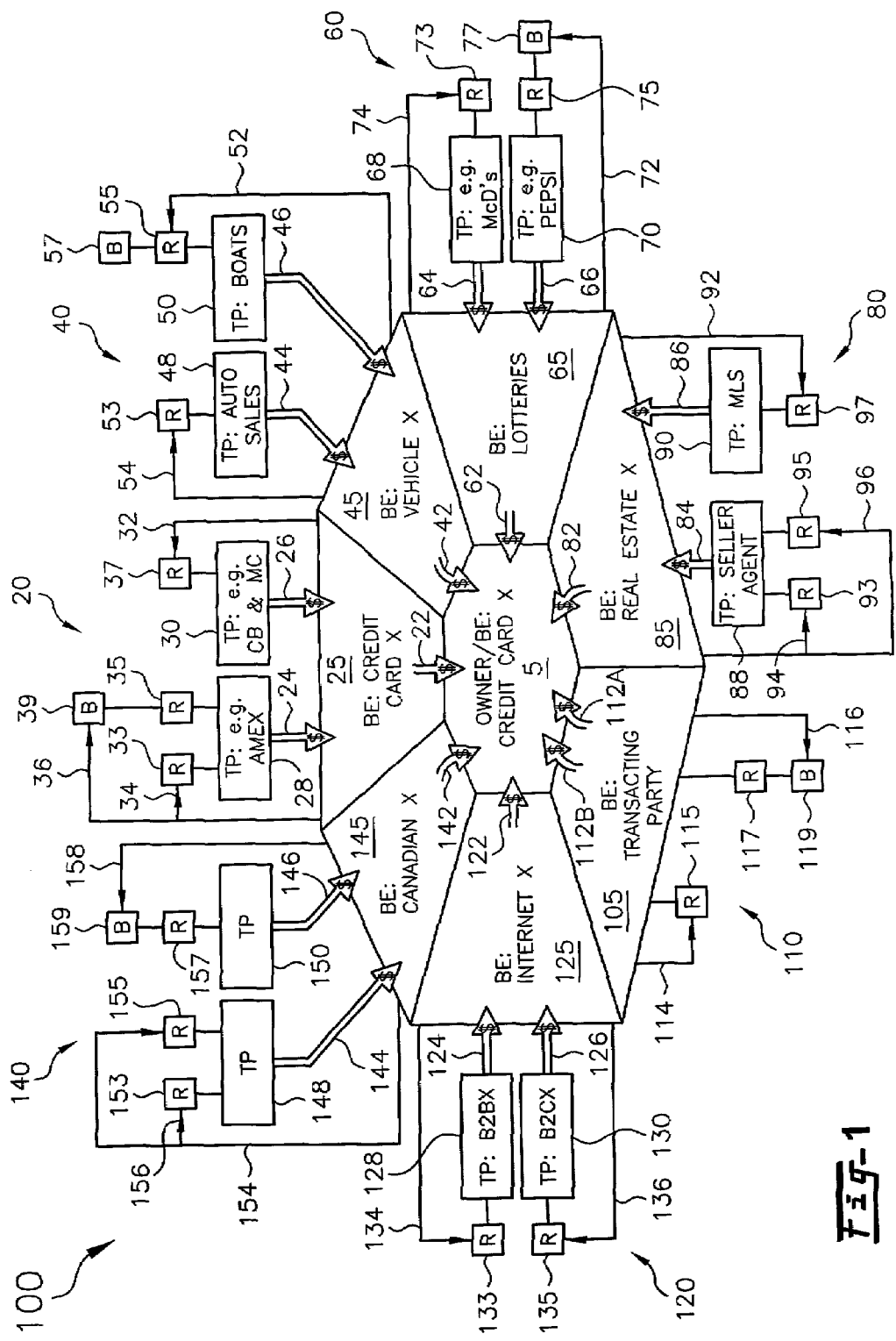
FIG. 1 is a schematic illustration of one embodiment of the incentive award method in accordance with the present invention.

The present invention allows an incentive award administrator, identified as a business entity, to provide incentive awards to at least one recipient within a quantifiable transaction. In accordance with the present invention, the business entity provides an incentive award that comprises at least one investment chosen from a plurality of vehicles for investment.

Incentive award programs typically give recipients extra value for participating in a transaction. In accordance with the present invention, recipients are provided a chosen investment as an incentive award. Upon cashing in the chosen investment after the elapse of a period of time, the recipient's incentive award can be of greater value than when it was granted. Inasmuch as the incentive award can be perceived as a cost-free benefit to the recipient, the potential to receive even greater value by having the investment grow during a pre-cashing in period can be a strong incentive to recipients to participate in such rewarded transactions. In turn, commercial parties are also strongly encouraged to pay a participating fee to the business entity to have their business transactions so rewarded, particularly in commodity, or semi-commodity, market sectors in which strong brand names are not present and in which a strong incentive program could lead to market share gains by its proponents.

In accordance with the present invention, either the business entity or recipient may choose the incentive award from an offered plurality or menu of investment vehicles. The offered menu can be divided into two basic categories: firstly, those investments in which the business entity cannot issue dilutive instruments of ownership, for instance, money market finds, mutual funds, bonds and other investments characterized by the business entity not having authority to issue shares in equity. And, secondly, a category of investment vehicles in which the business entity can issue dilutive instruments of ownership, for instance in its own value or that of a related entity or that of any entity in which it has the authority to issue shares or other instruments of ownership, as traded publicly on a stock exchange or by means of a private placement, for example.

The business entity may be in a position to offer several different investment vehicles that fit in this second category. For instance, in the case of a business entity that is a company with shares in its equity that are tradable on a stock exchange, these shares can be granted as awards. The business entity may elect to isolate a part of its overall business, for instance, its incentive program activity, and establish a publicly tradable tracking company, shares of which can be granted as awards. The business entity may elect to offer the shares of a hierarchically related enterprise, for instance, a holding company, a division or a subsidiary, as awards. Further, the business entity may be granted authority by any entity to issue dilutive instruments of ownership in the granting entity's equity, for instance, in its shares as publicly tradable on a stock exchange. The shares of a company transacting with the business entity, for instance, a company paying fees to fund incentive awards by the incentive company to the transacting company's customers, could be offered as an investment vehicle. Likewise, the shares of a company that is not otherwise transacting with the business entity could, by mutual agreement involving the business entity being authorized to issue dilutive instruments of ownership, be offered by the business entity as an investment vehicle.

Offering prospective recipients an award chosen from this second category of investment vehicles enables the business entity to provide an exciting array of incentives, including more volatile and potentially more profitable choices than even the most aggressive of mutual funds. Additionally, the business entity is not required to transfer immediately the fees it receives from participants into money market funds, mutual funds and the like. Rather, recipients typically have account balances enumerated in shares of equity and monetary funds have typically not been disbursed in order to establish these investment accounts. Further, upon cashing-in, instruments of ownership such as shares of stock, may be issued and sold by the business entity and the unit value of previously issued instruments is thereby subject to dilution. That is, satisfaction of the incentive awards is by means of funds derived from the issue of instruments of ownership, such as shares of common stock, rather than from the working capital of the business entity.

This method of funding an award exists in the prior art primarily in the context of employee incentives in which shares are granted in the equity of the employer company, beneficiaries are most frequently senior executives, the incentive is not paid unless a pre-defined performance objective is achieved and the recipient is typically required to pay a predetermined option price at such time as the recipient elects to accept the incentive that has been offered. The present invention differs significantly from the narrow prior art means of providing a single investment vehicle, subject to performance requirements, as an incentive by an employer to an executive employee.

An aspect of embodiments of the present invention is that bounds are placed on the amount of dilutive equity granted to recipients, no matter how many they may be, yet the method can self-adjust to accommodate cashing in of substantial awards by as many or as few recipients as there may be. Key elements in these embodiments of the method include granting no more than a defined portion of the equity in a given period, granting no more than a known portion of the equity no matter how long the method is employed and relating the cashing-in value of the award to the price per share of the granted equity at the time of cashing-in. The embodiments of the method that restrict the granting of equity ensure that the business model has long term viability. They are likely to foster a favorable appraisal of the business entity by economic analysts and this appraisal will likely positively reflected in the price of shares in the equity of the business entity. A strong share price, arising from a sound business model, will tend to furnish recipients with substantial awards when cashed in. Indeed, the greater the volume of profitable business conducted by the business entity, the proportionally higher its unit share price is likely to be, whereby embodiments of the business method enable an essentially unlimited number of recipients to have the prospect of cashing in awards of substantial value.

The present invention allows recipients to name any third-party beneficiary to receive their incentive award. Accordingly, recipients can use their incentive awards as charitable donations to favorite religious and nonprofit organizations, thereby allowing recipients to donate cost-free gifts. Recipients can use the incentive awards to fund trust accounts for dependents or others. Moreover, the incentive awards can be used to fund pension plans or other tax-deferred plans, such as Section 529 plans for qualified educational expenses. Additionally, the incentive awards can be bequeathed.

The description that follows is arranged into the following sections: Carrying out the Incentive Award Method, Apparatus and Carrying Out the Implementing Method, and Examples.

Carrying out the Incentive Award Method

FIG. 1 shows one embodiment 100 of incentive award method and of the structural relationships of the parties participating in the incentive award method of the present invention. The steps of the method of the present invention can be implemented in a number of ways without departing from the spirit of the invention. The owner of the incentive award method 5 can be the business entity carrying out the entire method itself. The owner 5 can establish one or more authorized operators to carry out at least part of the incentive award program. For instance, to offer the incentive awards of the present method, but not to have the right to specify terms and conditions of the method nor to prepare their own advertising material. Any authorized operator granted authority to carry out the program in its entirety is thereby entitled to act as the business entity of the present invention. Their authority will include establishing additional authorized operators. Authorized operators may also be granted authority to carry out all of the elements of the program, but in a specified market niche, geographical area or the like, thereby entitling them to act as the business entity in the defined sector. Authorized operators may also function as implementers of parts of the program, for instance by establishing and operating communications networks and data processing facilities.

Referring to FIG. 1, the owner of the incentive award method 5 has contracted with several authorized operators to act as business entities 25, 45, 65, 85, 105, 125, 145, which carry out the incentive award method. As shown, business entity ("BE") 25 is carrying out the present incentive award method in transaction set 20, exemplified as credit card transactions; BE 45 in transaction set 40, exemplified as vehicle transactions; BE 65 in transaction set 60, exemplified as lotteries; BE 85 in transaction set 80, exemplified as real estate transactions; BE 105 in transaction set 110, exemplified as transactions where the transacting party is also the business entity; BE 125 in transaction set 120, exemplified as Internet transactions; BE 145 in transaction set 140, exemplified as transactions in Canada. In the drawings, the term transactions is indicated by "X."

Figure 2:
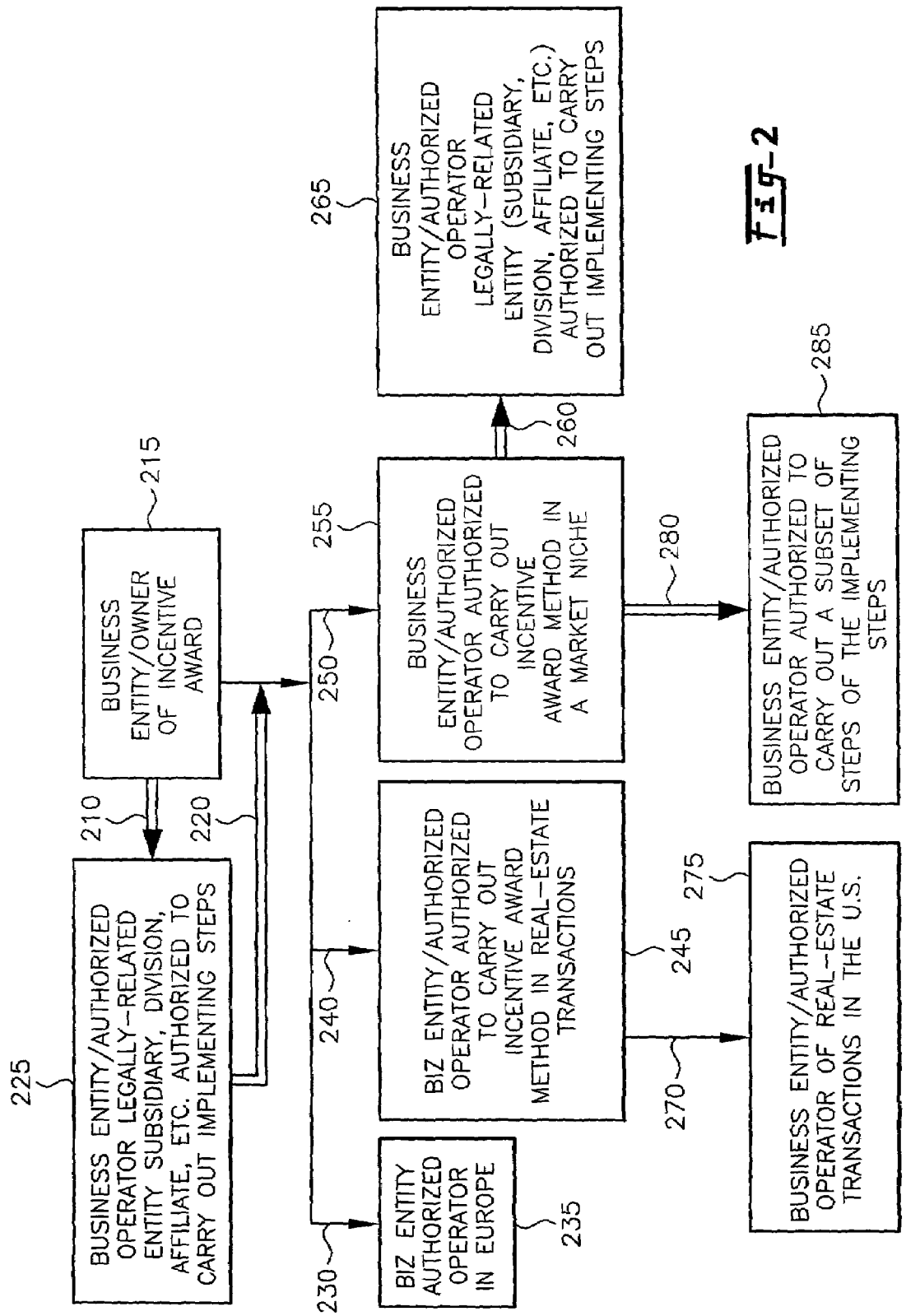
FIG. 2 is a schematic illustration of one embodiment of organizational relationships among business entities and authorized operators carrying out the incentive award method.

FIG. 2 illustrates in a less detailed fashion another embodiment of the possible structural relationships among the parties participating in the incentive award method. FIG. 2 also illustrates the potential of the present method for apportioning contractual authority between the owner of the incentive award method and the licensed authorized operators. Referring now to FIG. 2, BE 215 is the owner of the incentive award method of the present invention. BE 215 has contracted with authorized operators 235, 245, 255, to carry out the present incentive award method in selected market niches or in geographic locations. That is, authorized operators 235, 245, and 255, by paying the contracted-for licensing fee to BE 215, carry out the incentive award method as business entities in specific markets. As exemplified, BE 235 carries out the present method in Europe; BE 245 in real estate transactions; and BE 255 in another market niche, as yet unidentified, e.g. Internet transactions, credit transactions, vehicle transactions, or the like. Also, as exemplified, BE 245 contracts with authorized operator 275 to carry out the present method in a subset of its licensed market niche in real estate transactions in the United States. In effect, BE 245 carves out a portion of its authority licensed from BE 215 to sub-license it to BE 275 in return for fee 270.

FIG. 2 illustrates the potential for diversity in the organization of and the structural relationships among the parties authorized to carry out the present invention. The owner of the present method can license a business entity to carry out the entire method in a market niche, such as shown by arrows 240 and 250 or in a geographic location, such as shown by arrow 230. Alternatively, a business entity can be licensed to carry out a subset of the method as shown by double arrows 210, 260 and 280. These arrows indicate that business entities 225, 265 and 285 are authorized to carry out the steps of the implementing method of the present invention, shown in detail in FIG. 8. The implementing method functions as the accounting algorithm of the overall incentive award method in which, using a programmed computer and computer storage memory device, a business entity determines the value of the incentive award, credits that value to the recipient's account (also termed providing), and then cashes-in the award when the award becomes eligible to be cashed-in.

FIG. 2 also illustrates that a business entity practicing the entire incentive award method may contract with or delegate to another entity, such as a subsidiary, division, affiliate and the like, the right to carry out a subset of the method, e.g., the computer-executed implementing steps. As shown, BE 215 has created such a carve-out of its authority by licensing to BE 225 the right to carry out the implementing steps of the present invention for BEs 235, 245 and 255, as depicted by arrow 220. Also shown, BE 255 has similarly created carve-outs of its authority to BEs 265 and 285 to execute the implementing steps, depicted by arrows 260 and 285.

The embodiment, exemplified in FIG. 2 as well as that in FIG. 1, of authority carve-outs/licenses to practice the entire incentive award method or a subset of steps are but two of a variety of embodiments of structural relationships among participating parties for practicing the present invention.

Referring again to FIG. 1, business entity ("BE") 25 is an authorized operator of the incentive award method by virtue of the licensing fee, indicated by arrow 22 to owner 5. Fee 22 gives BE 25 the authority to carry out the method of providing incentive awards in credit card transactions 20. As exemplified, BE 25 has contracted with American Express Credit Division 28 and Citibank Master Card 30 as transacting parties ("TP"), whereby BE 25 rewards the credit card transactions in which 28 and 30 participate. In return, American Express 28 and Citibank 30 have paid to BE 25 a participating fee indicated by arrows 24 and 26, respectively. A participating fee may be a per-transaction fee, calculated as a percentage of the total revenue amount of the transaction; a flat sum paid annually; a stepped fee, i.e., wherein different fee amounts are paid depending on the occurrence of certain milestones; or the like. In determining what fee amount a transacting party pays, the business entity may consider any number of commercial variables, such as the geographical location of the transaction; whether the transaction value exceeds a monetary amount; seasonal variation in consumer buying, etc. In FIG. 1, those fees which fund the incentive award program are indicated by arrowheads with an accompanying U.S. dollar sign, which means a fee amount in any currency.

TPs American Express 28 and Citibank 30, by virtue of the participating fee paid by them, may each negotiate with BE 25 the right to specify which class(es) of other parties participating in transactions with them will be recipients ("R") of the incentive award. In addition, the BE may also designate certain transacting parties as recipients. In transaction set 20, one exemplary class of recipients can include the purchasing credit card consumer, identified here as R 33. Another exemplary class of recipient, identified as R 35, may be a sales clerk who achieves a sales goal. Also, shown here is the step afforded by the present method in which a recipient, R 35, designates a third-party beneficiary, B 39, to receive the award instead.

Figure 3:
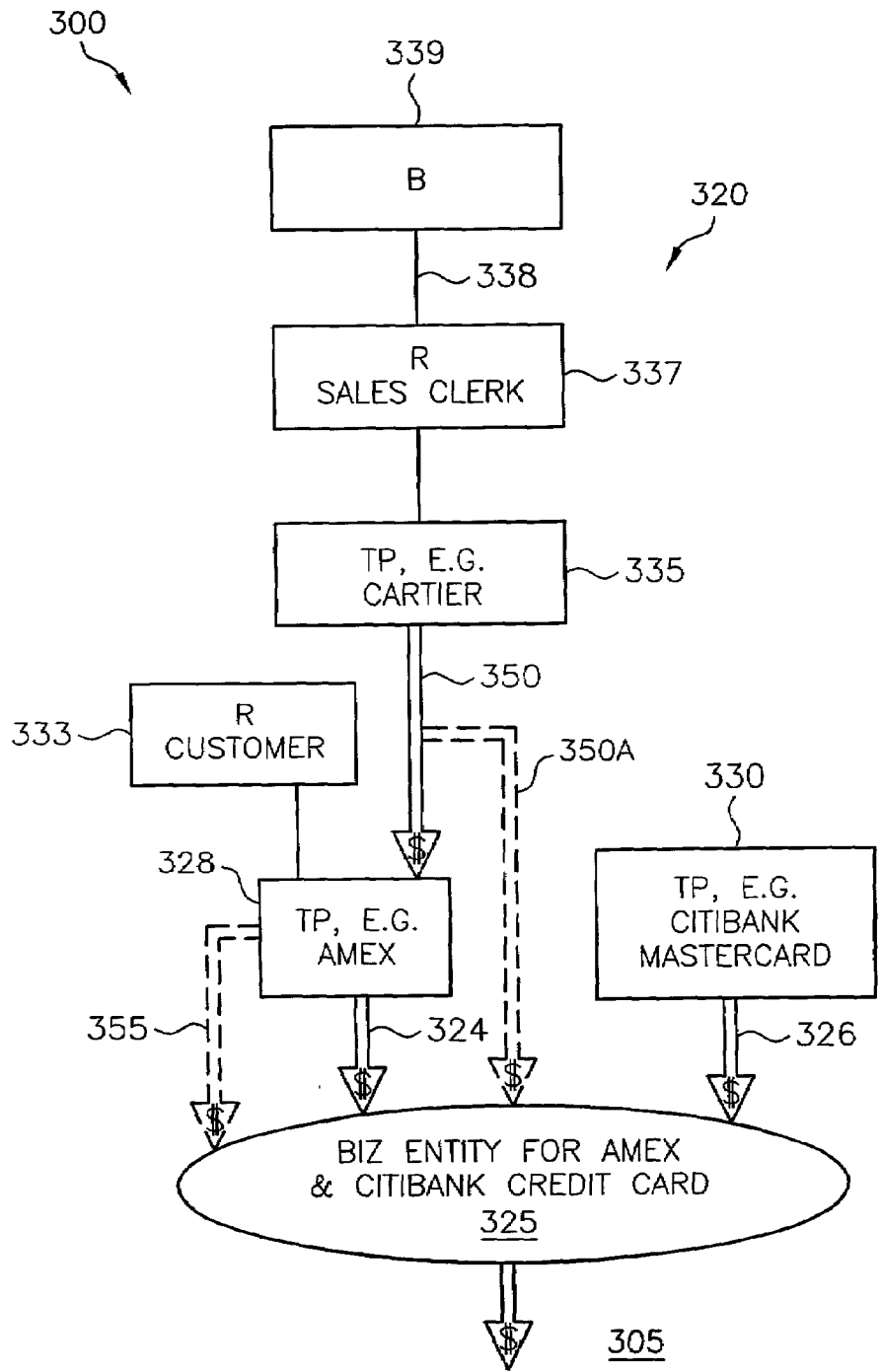
FIG. 3 is a schematic illustration of further embodiments of transaction 20 depicted in FIG. 1.

Referring now to FIG. 3, a further embodiment 300 of carrying out credit card transactions using the incentive award method is illustrated therein. Moreover, embodiment 300 shows the potential offered by the present method to add additional layers of fee-paying transacting parties and rewarded recipients. The owner 305 of the incentive award program has the same relationship with business entity 325 for carrying out American Express and Citibank credit card transactions 320 as that exemplified in FIG. 1. However, FIG. 3 illustrates that high-end retailer transacting parties 335, such as Cartier, Tiffany, Bergdorf-Goodman, have contracted with TP 328 American Express to reward sales clerks, exemplified by R 337.

In addition to being a transacting party, if American Express contracts with BE 325 to also become an authorized operator/business entity, then Cartier as TP 335 pays participating fee 350 directly to American Express 328, which then provides the incentive award directly to eligible Cartier sales clerks R337. In return for the authority to become an authorized operator/business entity in the market niche of high-end Amex credit card sales, American Express pays to BE 325 an operating fee 355. Fee 355 is in addition to participating fee 324 American Express pays to BE 325 in order to designate those recipients to whom BE 325 awards incentive awards. This embodiment, is, in effect, the same as that described below for transaction set 110, in which a transacting party also participates in the incentive award method as a business entity.

Alternatively, if American Express 328 does not contract with BE 225 to become an authorized operator/business entity, then TP American Express 228 pays to BE 225 a portion of fee 350 it receives from Cartier 335. The portion of fee 350 that American Express 328 pays to BE 325 is indicated by arrow 350A. Fee 350A is necessary to fund the awards provided by BE 325 to R 337. To identify alternative embodiments, the arrows representing participating fees 355 and 350A, which are alternatively payable to BE 325, are dashed.

The concept of adding layers of transacting parties and rewarded recipients to create structural relationships among the entities participating in and/or carrying out the incentive award method is also illustrated by transaction sets 110 and 140 in FIG. 1. Referring again to FIG. 1, transaction set 110 shows the embodiment when a transacting party, exemplified as entity 105, also carries out the present method as a business entity in those transactions. For transaction set 110, here contemplated as any kind of transaction, when the transacting party, e.g. a supplying vendor, also acts as a business entity, vendor 105 pays what amounts to two fees, shown here as 112A and 112B. Fee 112A exemplifies a participating fee, by which vendor 105 becomes a transacting party that can designate recipients to be rewarded by BE 5. Fee 112B exemplifies an operating fee owed to BE 5 by which vendor 105 also becomes a business entity in its own right. The description of FIG. 3 above exemplifying American Express as a transacting party/business entity also applies to this embodiment of the present invention.

By way of further illustration, consider that BE 105 is an airline, say British Airways, which rewards its customers through the present method. Such customer recipients are identified as R 115. British Airways, here BE 105, also chooses to reward through the present method its travelers who consistently fly first class, identified as Recipients R 117. By paying the appropriate participation fee 112A, British Airways designates these two classes of recipients R 115 and R 117 to be rewarded. In addition, by paying operating fee 112B, British Airways becomes a business entity authorized to carry out the present method in its entirety for those of its customers it chooses to reward.

Acting as a business entity, British Airways can decide not to pay participating fees 112A to BE 5, but rather to use these sums to fund and eventually disburse incentive awards to the recipients it chooses to reward.

One of the most notable advantages for a transacting party to also become a business entity operating the present invention is that the BE/TP can decide for itself to offer as an incentive award dilutive instruments of ownership in its own equity value or in the value of any other entity in which it is entitled to issue dilutive instruments of ownership. As a business entity, British Airways can offer its own stock, options in its own stock, tracking stock, or warrants for its own stock as the incentive award provided by the present method.

FIG. 1 illustrates that transaction set 140 comprises quantifiable transactions rewarded by the present method, which are conducted in Canada. Business entity 145 pays fee 142 to owner 5 to become authorized to carry out the present method in Canada. Transacting party 148 pays participating fee 144 to designate recipients R 153 and R 155 to receive incentive award 154 and 154, respectively. Similarly, transacting party 150 pays fee 146 to designate R 157 to receive an incentive award. As shown, R 157 names B 159 as the entity who will receive award 158 instead of R 157. As in transaction sets 20 and 110 in FIG. 1 and in transaction set 220 in FIG. 2, carrying out the present method in transaction set 140, and indeed with any kind of quantifiable transaction, allows variation in the structural relationships among the business entity/authorized operator, fee-paying transacting parties and rewarded recipients. For business entities carrying out the present invention, in a geographical location, such as Canada, the present method provides for any number of fee-paying transacting parties and accordingly any number and kind of rewarded recipients. Also, any number of fee-paying transacting parties can become business entities/ authorized operators, a process described in more detail in the preceding section. For example, in transaction set 140 in FIG. 1, by paying an operating fee to BE 145, transacting party 148 can become a business entity entitled to operate the incentive program in full in a transaction subset, say, Canadian credit card transactions.

FIG. 1 also illustrates that the present invention can be practiced in transactions involving large-ticket items, such as cars, boats and other vehicles, identified as transaction set 40. As in other transaction sets described previously, transacting party 48, identified as an auto vendor, and transacting party 50, identified as a boat vendor, pay participating fee 44 and 46, respectively, to BE 45. In return for the participating fees, BE 45 provides incentive award 54 to R 53 and provides award 52 to beneficiary 57, which R 55 designates as the substitute recipient.

Figure 4:
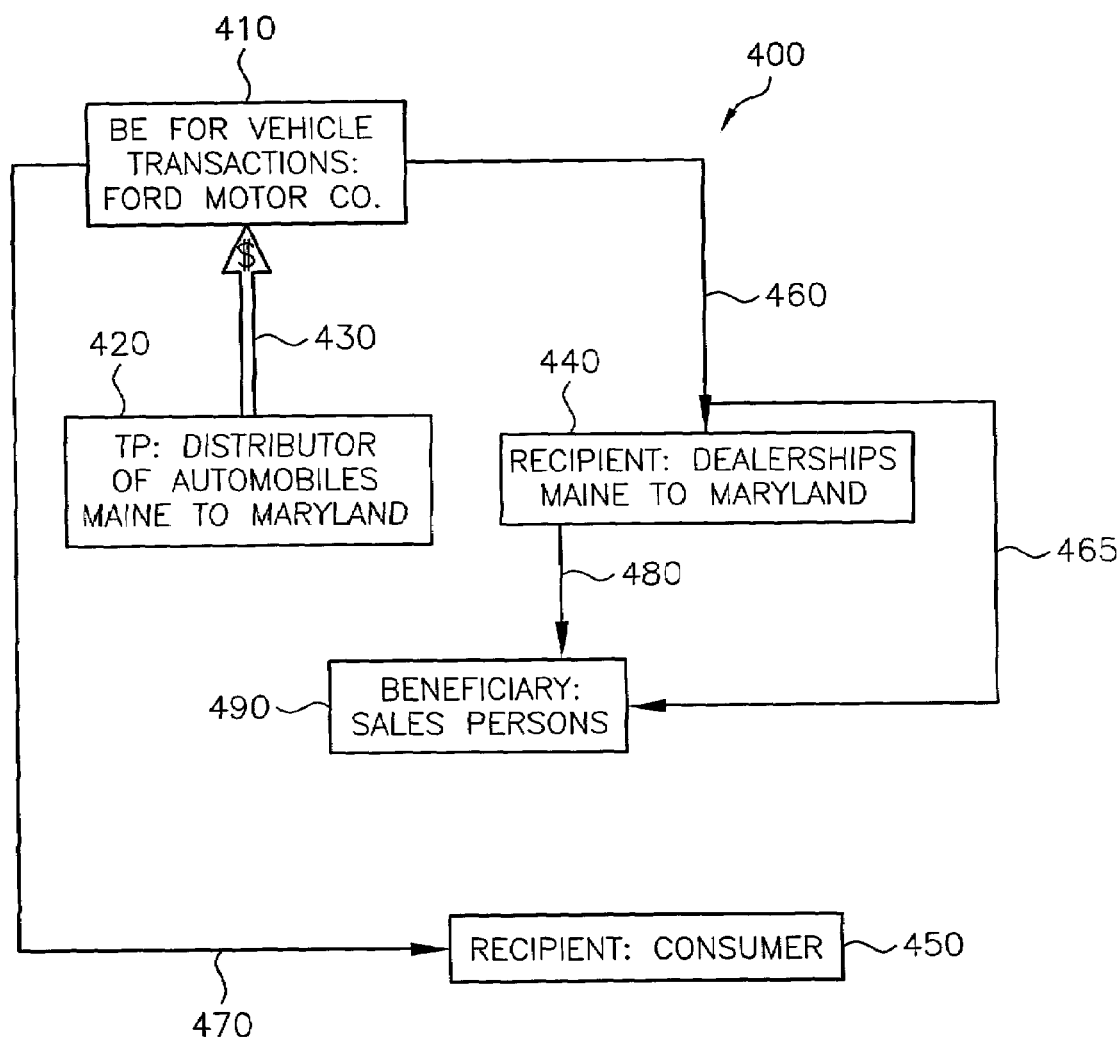
FIG. 4 is a schematic illustration of an apparatus for carrying out an incentive award program in accordance with the present invention.

FIG. 4 illustrates in a more detailed fashion one embodiment of the present invention for car sales to consumers, identified as transaction set 400. For example, TP 420 is a distributor of Ford vehicles for the Eastern coast of the United States, whereby TP 420 supplies Ford vehicles to various car dealerships from Maine to Maryland. One of the business goals of TP 420 is to gain market share without having to discount the price of automobiles in its inventory to the dealerships it supplies. To accomplish this goal, TP 420 contracts with BE 410, say, e.g., Ford Motor Company, to provide incentive awards to its dealerships. Ford is a business entity that can provide an incentive award that comprises an investment in dilutive instruments of ownership in its own equity value, i.e., Ford can provide incentive awards of its own stock, in a tracking stock or other instrument. TP 420 pays participating fee 430 to BE 410 to reward dealerships R 440 and consumers R 450 with incentive awards, represented by arrows 460 and 470, respectively. In this way, distributor TP 420 can accomplish its business goals of achieving undiscounted sales at two levels, that of the dealership and that of the consumer.

Moreover, dealerships R 440 can in turn utilize the incentive award to motivate their sales personnel to increase sales by designating them as beneficiaries of the incentive award provided by the BE 410. Beneficiary designation is exemplified at arrow 480, the beneficiaries are identified at node B 490 and the providing of the incentive award to the beneficiaries is identified by arrow 465. In this way, the present invention can be used by businesses to award designated employees through the practice of identifying beneficiaries of the corporate recipient's awards. The present invention, through the practice of beneficiary designation, allows investment incentive awards to be provided in hierarchically-nested patterns whereby a corporate recipient passes along rewards to certain employees. In other words, the present invention offers a mechanism to corporate recipients for creating an internal incentive award program without an administrative or operating cost which serves to encourage corporations to participate as recipient-transacting parties in the present incentive award method.

When BE 410 determines that a consumer R 450 and an auto salesperson (B 490) are to receive the incentive award, according to the present invention, the incentive award for each recipient is chosen from plurality of offered investment vehicles. In one embodiment, BE 410 chooses which of the offered investment(s) make up the incentive award. In another embodiment, the recipient, e.g., customer R 450, chooses the investment(s) that make up the award. In a still further embodiment, BE 410 chooses at least one of the investments and the recipient, e.g., customer R 450, chooses at least one award. In any of these embodiments, if the investment chosen as the incentive award includes Ford stock, Ford tracking stock, stock options and/or warrants, then Ford, as BE 410, credits the consumer's award account with an incentive award amount, typically a number of shares. At the end of a vesting period, which in a preferred embodiment is five years, Ford can raise the funds necessary to cash-in the recipient's account by issuing and selling, on the open market or in a private placement, shares that can be dilutive of the unit value of previously issued shares.

Referring again to FIG. 1, transaction set 60 includes any quantifiable transaction in which a supplier offers to a purchaser a chance to win a prize in a lottery. Embodiments of the present invention comprise providing at least one transacting party in a quantifiable transaction a chance to win at least one prize in a lottery as an incentive award, the prize comprising at least one investment chosen from a plurality of vehicles for investment. Two examples of lotteries are illustrated in FIG. 1: one in which TP 68, here illustrated as McDonald's, and another in which TP 70, illustrated as Pepsi Corporation, offers to consumers of their respective products a chance to win a prize having monetary value. It is contemplated that the present invention can reward any lottery transaction, including state and municipal lotteries. The lottery embodiment of the present invention may also be found to represent a form of incentive award program having special appeal to consumers in other gambling contexts, such as off-track betting and casino wagering.

As illustrated, McDonald's 68 pays to BE 65, authorized to operate the present method in transaction set 60, participating fee 64; similarly, Pepsi 70 pays participating fee 66. To be sure, these fees need not be the same amount but are tailored to each kind of transaction to be rewarded. To illustrate this point, say Pepsi transactions involve providing a $1,000,000.00 prize to the few of its customers whose Pepsi-Cola bottle cap bears a certain insignia. The McDonald's transactions involve, say, providing a grand prize of large value, as well as free menu item having monetary value less than $5.00 to the many customers whose sales receipts bear a certain insignia.

By virtue of fee 64, customers R 73 of McDonald's 68 are provided a chosen investment incentive award 74 by BE 65. The incentive award 74 may equal the value of the lottery prize or constitute a portion of the lottery prize. Because the monetary value of some of the awards granted for McDonald's transactions are small, BE 65 may find their value to be less than the unit value of even the smallest chosen vehicle for investment, may decline to issue awards of fractional vehicles for investment and may provide, quite possibly at a check-out counter, the monetary equivalent of the fractional unit value of said smallest vehicle.

By virtue of fee 66, customers R 75 of TP Pepsi 70 are provided incentive award 72, which has, as shown, been designated by R 75 to go to B 777. Because the Pepsi lottery prize has substantially larger value than the McDonald's prize, Pepsi 70 and BE 65 can negotiate that portion of the prize amount that will be provided as a chosen investment incentive award. One example can be that, for $1,000,000.00 winners, BE 65 provides twenty-five percent of the prize amount as a chosen investment incentive award. To the extent negotiated between TP Pepsi 70 and BE 65, a large investment incentive award will likely create a large fee 66 charged to Pepsi for providing the incentive award to Pepsi lottery winners. But also, to the extent that thousands of McDonald's customers R 73 may be likely to win a prize that includes an incentive award, McDonald's may also be charged a significant participating fee.

Transaction set 80 comprises all manner of real estate transactions, including, but not limited to, sales of developed or undeveloped real property, leases, short-term rentals, exchanged use rights, such as vacation-home swapping, and the like. Besides including a large variety of transactions, transaction set 80 lends itself to rewarding a large number of different kinds of recipients. FIG. 1 illustrates but one of a very large number of embodiments of the transacting parties and recipients and the structural relationships among them.

As shown, TP 88, a real estate agency, pays to BE 85, authorized to reward real estate transactions, participating fee 84. In return for participating fee 84, BE 85 negotiates with TP 88 to provide e.g., the seller/owner of the property R 93 with award 94, and the buyer/lessee, R 95 with award 96. Also, as shown, a multiple listing real estate service ("MLS") 90 pays to BE 85 participating fee 86. In return, BE 85 negotiates with TP 90 to provide, say, the buyer/lessee of the property 97 with investment incentive award 92. In this embodiment, it is contemplated that buyer R 95 is the same as R 97 in order to show that the same recipient may be rewarded more than once for the same transaction. Multi-rewarding depends on how the transacting parties and the business entity/authorized operator has contracted to provide awards to certain recipients.

BE 125 is authorized to provide incentive awards of the present invention for all Internet transactions, exemplified as transaction set 120. The illustrated embodiment of Internet transactions 120 shows a very small sample of the possible universe of such transactions that can be rewarded by the present method, and actually only two broad classes are shown: business-to-business ("B2B") and business-to-consumer ("B2C").

As illustrated, Internet transactions 120 are rewarded by the present invention when transacting party 128 for business-to-business ("B2B") transactions pays participating fee 124 and/or when transacting party 130 for business-to-consumer ("B2C") transactions pay participating fee 126 to BE 125. In return, BE 125 provides incentive award 134 to those recipients designated as R 133 and incentive award 136 to those recipients designated as R 135 and pays operating fee to the owner of the incentive award method BE 5.

FIGS. 5A and 5B illustrate in greater detail two embodiments 500, 550 of the present method for rewarding a business-to-business transaction. In both embodiments, supplying company 520, 552 uses a supply chain 549, 599 with downstream distributor(s) to get its products/services to the purchasing customer company 540, 580. Different from FIG. 5A, FIG. 5B illustrates the embodiment in which a business entity also acts as a transacting party.

FIG. 5A depicts the embodiment in which business entity 510 participates in B2B transactions only as the administrator of the incentive award program. Transaction 500 involves distributing the supplier's 520 goods/services through supply chain 549, which constitutes selling the goods/services to one or more levels of downstream distributors 530, depicted by arrow 525. The distributors 530 in turn sell the supplier's goods/services to purchasing company 540, depicted by arrow 535. Throughout supply chain 549, the agents of the supplier 522, of the distributors (not shown) and of the purchaser 542 are responsible for executing the smooth, continuous and profitable movement of goods and services. To advance certain business goals, supplier 520 participates in the incentive award method of the present invention by paying participating fee 515 to BE 510. One such goal may be to encourage its own sales agents. It negotiates with BE 510 to provide a reward according to the present invention to its agents 522, as depicted by arrow 545. Another of its business goals may be to encourage purchasing agents 542 of purchaser 540 to favor supplier 520 when they make purchases; supplier 520 arranges with BE 510 to also reward purchasing agents 542 through the present method.

FIG. 5B also shows sales agents 554 and purchasing agents 582 rewarded through the present invention. However, FIG. 5B shows an embodiment in which the business entity also acts as a transacting party, in particular as downstream distributor 560, which passes (arrows 565 and 575) supplier's 552 goods/services to purchaser 580.

FIG. 6 depicts by flow chart, a general embodiment of the present invention for an Internet transaction when a certifying mark is used to identify the business entity, the portal through which the transaction is conducted and the web sites of the transacting vendors. The present method contemplates providing chosen incentive awards in all Internet transactions, whether or not conducted through an Internet portal operated, hosted or maintained on behalf of the business entity carrying out the method for Internet transactions.

Figures 6B, 6C:
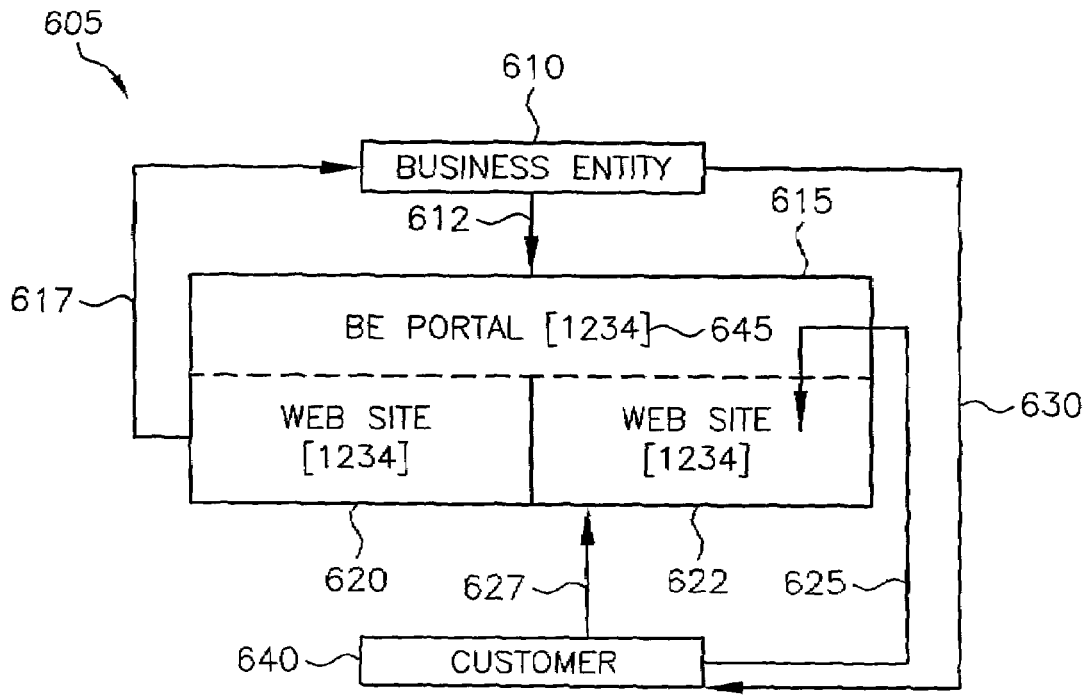
FIG. 6 is a schematic illustration of a multi-level business to business transaction of the incentive award method.

As shown in FIG. 6A, the present method generally begins with conducting rewarded transaction 600. FIG. 6B illustrates that transaction 605 is conducted through Internet portal 615, operated, hosted or maintained (arrow 612) on behalf of business entity 610. Fee 617 is paid by transacting parties, exemplified here as TPs Amazon.com and Sears.com, to participate in the present incentive award method. Each TP operates its own incentive award web site, 622, 620, respectively. When customer 640 wishes to shop Amazon.com's web site 622 and be rewarded (arrow 630) by the present method for the purchase, customer 640 can either link through from BE's portal 615 (arrow 625) or link directly (arrow 627). Linking-through mechanisms include hypertext links, intranet, extranet, proxy server and the like.

Referring again to FIG. 6B, once customer 640 is determined to be a recipient of award 630, the investments that make up the incentive award (step 650 in FIG. 6A) are chosen. In some embodiments, the recipient 640, chooses; in others, the business entity 610 is responsible for choosing and then presents to the recipient a menu 655 of offered vehicles for investment from which to choose. In still other embodiments, both the business entity and the recipient choose. FIG. 6C illustrates an example of a menu 660 of offered vehicles for investment 662 and a corresponding list of codes 664 assigned to each. As shown, certifying mark [1234] 645 identifies the business entity 610. Also as shown, the certifying mark codes, plus the individual codes of the offered investments may be used to create a novel data structure by which the choices that make up the investment incentive award can be entered and stored in a database in a computer memory, e.g., transaction database 735 (FIG. 7). Such a database may be used together with a database of the terms and conditions for providing each chosen investment to calculate the value. (See FIG. 8).

Referring again to FIG. 6A, after the investments are chosen, the business entity provides the incentive award in step 670, which includes determining the value of the incentive award 675. Business entity 610 uses the stored vehicle for investment choices with input logic regarding the terms and conditions for providing each chosen investment to calculate a value or amount for the incentive award (See FIG. 8). After a value or amount is calculated, and during the period of vesting for the award, the business entity or its agent provides the recipient with periodic statements of the award's value or amount as of the date of each statement (step 685). After a period of vesting, the business entity cashes-in the chosen investments and conveys the value to the recipient (step 695).

Apparatus and Carrying out the Implementing Method

Referring to FIG. 7, an apparatus 700 for carrying out the incentive award program of the present invention includes a main controller 710 and input devices, shown here schematically as 780 and 790 to illustrate that any number of input devices may be in communication with and transmit information to the main controller 710. The input devices collect information regarding the transaction and the choice of vehicles for investment as the incentive award from several sources [not shown], which include data on any transacting party participating in a rewarded quantifiable transaction, e.g. a purchasing customer, supplying vendor, sales agent, purchasing agent, distributor, and the like, as well as designated recipients. The information transmitted to the main controller 710 may be encrypted for security and/or privacy purposes. The main controller 710 stores this information and generates a recipient's account. The main controller 710 may be operated by several types of entities, such as the owner of the method; an authorized operator; a commercial transacting party; e.g. a credit and clearinghouse; a credit issuer; or a party authorized only to perform the computer-executed steps of implementing the incentive award method (See FIG. 3).

Input devices 780 and 790 include computers, network terminals or other devices that transmit to the main controller information regarding the transaction and the choice of investments. Information may be input via input devices 780 and 790 in a variety of ways. For example, in a business-to-consumer transaction conducted at a Point of Sale ("POS") terminal, the sales clerk or customer may enter in required data not already input into the communications network by the payment card, regardless of whether the transaction is paid for by cash, credit card, debit card, telephone card or the like. For those business-to-consumer transactions conducted over the telephone, a sales operator may key in the required information; in unassisted telephone transactions, the consumer may key in the information through the telephone keypad, for instance, when the telephone is connected to a voice-response unit ("VRU"). In such business-to-consumer transactions conducted over the Internet, the consumer may input the required information through a keyboard, mouse, or other conventional input device, for instance, in response to prompts to submit information. For business-to-consumer transactions conducted face-to-face, such as a bank loan, mortgage acquisition, real estate transaction, vehicle purchase as well as for business-to-business transactions, a commercial agent facilitating the transaction may enter the required information through a computer, network terminal or the like. Those skilled in the art will readily appreciate there are other methods for inputting the necessary information regarding the transaction and choice of investments.

The main controller 710 comprises a processor 715 that is connected to a data storage device 720. The data storage device 720 may be a RAM, floppy disk, hard disk, RAID, SAN or combinations of these. Processor 715 is in communication with each of the plurality of input devices 780, 790.

The processor 715 and the storage device 720 may be located entirely within one computing device. They may be located remotely from each other, as, for example, when linked by a serial port cable, telephone line or radio frequency transceiver. In addition, the connection between the processor 715 and the storage device 720 may comprise some combination of local and remote linking, e.g., such as when the main controller 710 comprises one or more computers—each of which may be local to each other or remotely connected—which in turn are connected to a remote server computer for maintaining databases.

Figure 8B:
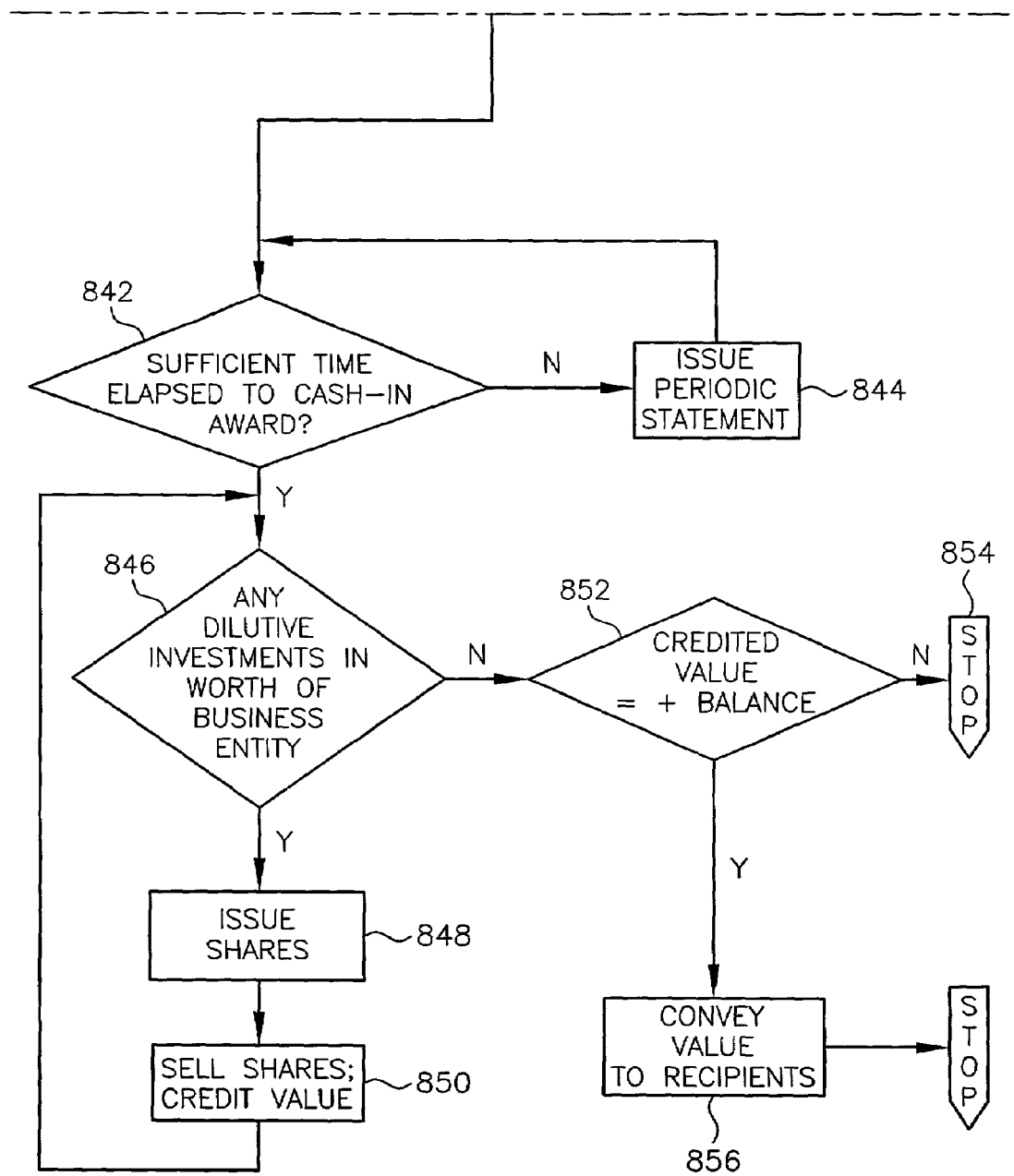
FIG. 8 is a flowchart illustrating the computer-executed implementation method of the present invention.

The storage device 720 stores a program 725 for controlling the processor; a transaction information database 735; a terms-and-conditions database 745; a transacting parties database 755 and a recipients' account database 765. These databases may be combined into one database or any other combination of databases, so long as the stored information needed to calculate the value of the incentive covered is available to program 725 on demand. Program 725 controls the processor in accordance with the methods of the present invention, and in particular in accordance with the computer-executed method for implementing the incentive award method (FIG. 8). As appropriate, program 725 also includes device drivers for controlling peripheral apparatus as well as other necessary software instructions known to those skilled in the art for accomplishing computer-executed methods. Of particular relevance, program 725 comprises the calculus, that is, the individual algorithms relevant to each kind of rewarded transaction for calculating the value of the recipient's incentive award.

The transaction database 735 includes the names of the transacting parties in the transaction, the transaction date, its monetary value, and may include any other information the business entity deems appropriate for determining a measure of the transaction's profitability to the business entity, such as a parameter related to geographic location. In addition to containing transaction particulars, transaction database 735 also includes the choice of those investments from the offered menu of investment vehicles that comprise the incentive award. Inasmuch as either the recipient or the business entity or a combination of both may choose which investments make up the incentive award, different embodiments of data structures compiling this information are contemplated by the present invention. For those transactions in which the business entity chooses all or some of the incentive award investments, data entry at the data input device reflects this and the recipient is not prompted to choose. Instead, the program will instruct the processor to search the terms-and-conditions database 755, in which predefined choices of investments for a specific commercial transacting party and/or for a specific kind of transaction are stored. For transactions in which the recipient chooses all of the incentive award vehicles for investment, the recipient is either prompted for choice input at the time of the transaction or within a predefined period. If response is not forthcoming within a certain period, the transaction is not rewarded. One embodiment of the menu used to record investment choices into transaction database 725 is illustrated in FIG. 6C. The transaction database 725 is more or less continuously updated with new transaction information.

The transacting parties database 745 contains information about each transacting party who has paid a participating fee to the business entity in order to have its transactions rewarded by incentive awards of the present invention. This information may include how the participating fee is charged, whether as a fee per transaction, annual amount, etc.; the amount of the fee; and, which transacting parties are to be recipients.

The terms-and-conditions database 755 includes the variables necessary to be inserted into program 725 in order to calculate the values or amounts of the incentive awards. These variables include, for each investment offered: the duration of the vesting period; the cashing-in deadline date; and a code indicating whether the investment does or does not constitute instruments of ownership, such as stock, options or warrants, in the worth of an entity in which the business can issue dilutive shares. In addition, this database includes variables for identification of which transacting parties are recipients of the award, and, when applicable, which beneficiaries they have designated.

As described herein, identification of recipients comes from three sources: the transaction database 735; the transacting-parties database 745 and the terms-and-conditions database 755. The incentive award method of the present invention requires relatively straightforward database information, enabling it to function well as an added element in a variety of existing transactional formats. In business-to-consumer transactions, the purchasing consumer will generally be a recipient. Therefore, information that identifies the consumer will be collected during these transactions. For multi-level business-to-consumer transactions and business-to-business transactions, the transacting-party database 745 will be searched. Recipients' information need not be retained separately in a terms-and-conditions database 755, so long as this field contains logic for retrieving the recipients' information on demand.

Recipients' account database 765 includes the value or amount of the incentive award as calculated on or about the date of the transaction as well as periodic statements of the award value or amount, determined, for instance, every month, quarter, half-year, etc. Recipients are sent or transmitted these periodic statements throughout the vesting period. A recipient's account is automatically created in the recipients' account database 765 when an initial value or amount for the incentive award is calculated. A recipient's account is a record of several fields, possibly already resident in one or more databases, which comprises identification information for the recipient; nature of awarded transaction; date of transaction; starting value or amount of the incentive award; value or amount of the incentive award on milestone dates; end value or amount of the incentive award; whether the incentive award has been cashed-in; required cashing-in date (obtained from the terms and conditions database 755); and, whether the incentive award has expired worthless.

Referring now to FIG. 8, a computer-executed method for implementing the incentive award program 800 is performed by the main controller. Generally, before receiving transaction information, the main controller will be initialized (steps 802, 808 in FIG. 8A), i.e., the terms and conditions database 755, the transacting parties database 745 and the program 725 for calculating the value of the incentive award are input. The main controller 710 receives from input devices information about a rewarded transaction (step 810). In step 812, the program for calculating the value of the award queries the transaction database and the terms and conditions database as to whether the information regarding recipients of the transaction is complete. If not, the main controller sends a request for the needed information to the appropriate transacting party and/or recipient (steps 814 and 816). Depending on how the transaction was conducted, i.e., through the Internet, in person, over the phone, etc., the main controller will electronically transmit such a request or cause it to be sent. When complete, recipient information is stored (step 818).

The program queries the terms and conditions database to determine whether, for the transaction of interest, the recipient may choose any or all of the incentive award vehicles for investment. If so, at step 822 the main controller presents to the recipient the appropriate menu of investment vehicles for that particular transaction by electronic signal transmission or otherwise and receives the recipient's choice (step 824). If the recipient is not eligible to choose at least one vehicle for investment. the main controller gets a list of the pre-defined choices for that transaction from the terms-and-conditions database (step 826).

After the investments are determined (either step 824 or 826), the main controller calculates an initial value or amount of the incentive award (step 828), which calculation causes the program to create an account for the recipient in the recipients' account database and to credit the initial value or amount therein (step 828). The program queries during periodic account maintenance (step 842) whether the vesting period for recipient's award has expired. If not, the main controller issues to the recipient periodic statements of the balance credited in recipient's account (step 844).

EXAMPLES

What follows are examples of how the present invention may work in various transaction contexts. These examples are merely illustrative and do not limit the practice of the present invention.

Tables 1–5 depict business-to-business contexts in which a Business Entity (BE) implements the incentive method in transactions with its Supplier Companies, their Sales Agents, its Customers and their Purchasing Agents. In this example, shares in BE itself are chosen as the investment vehicle in which all awards to recipients will be made.

When it is determined that the vesting period of the incentive award has lapsed, the program queries whether the incentive award includes any instruments of ownership in the value of an entity in which the business entity can issue dilutive instruments of ownership (step 846). If yes, the business entity issues instruments of ownership, for instance, shares in that entity's value, sells the shares and credits the value to recipient's account (steps 828 and 850). If no such vehicles for investment are chosen as the incentive award, the program queries whether the credited value in recipient's account is positive (Step 852). If no, the incentive award has no monetary value that can be conveyed to the recipient and the method ends at step 854. If there is a positive credited balance in recipient's account, the controller causes that monetary value to be conveyed to recipient (step 856).

Table 1 is a compilation of sales by suppliers to BE in six successive periods, depicted for exemplary purposes as the calendar years from 2001 to 2006 inclusive. The data shown can be typical reports based on information stored in the Transaction Database 735 and the Transacting Parties Database 745. A series of entries document the annual sales made to BE by named suppliers, Companies A, B, C and D, and the cumulative annual sales to BE by all its other suppliers are also shown. Sales to BE by the total of all suppliers are summed for the calendar years from 2001 to 2006 inclusive. In some embodiments of the present invention, the data in Table 1 for an individual supplier such as Company A, taken together with the data showing the total sales by all suppliers, are sufficient inputs from the Databases 735, 745 to allow implementation of the incentive system. That is, details of individual supply transactions, such as the exact ship date, the exact products or services supplied, the invoice number and so forth, are not required.

The exemplary supplier sales figures listed in Table 1 double from year to year, from overall sales by all suppliers to BE totaling $10 million in year 2001 to $320 million in year 2006. This rapid progression of sales can be consistent with business operations initiated in year 2001 in the presence of the sales incentive of the present invention and in a market of a suitably large size.

TABLE 1

| SUPPLIER SALES ($) TO BUSINESS ENTITY (BE) BY CALENDAR YEAR | | | | | | |
|---|---|---|---|---|---|---|
| SUPPLIER/YEAR | 2001 | 2002 | 2003 | 2004 | 2005 | 2006 |
| COMPANY A | 100,000 | 200,000 | 400,000 | 800,000 | 1,600,000 | 3,200,000 |
| COMPANY B | 200,000 | 400,000 | 800,000 | 1,600,000 | 3,200,000 | 6,400,000 |
| COMPANY C | 300,000 | 600,000 | 1,200,000 | 2,400,000 | 4,800,000 | 9,600,000 |
| COMPANY D | 400,000 | 800,000 | 1,600,000 | 3,200,000 | 6,400,000 | 12,800,000 |
| OTHER COMPANIES | 9,000,000 | 18,000,000 | 36,000,000 | 72,000,000 | 144,000,000 | 288,000,000 |
| TOTAL: ALL SUPPLIERS | 10,000,000 | 20,000,000 | 40,000,000 | 80,000,000 | 160,000,000 | 320,000,000 |

TABLE 2

SALES AGENT SALES ($). COMPANY A TO BE, BY CALENDAR YEAR

| SALES AGENT | 2001 | 2002 | 2003 | 2004 | 2005 | 2006 |
|---|---|---|---|---|---|---|
| COMPANY A, #1 | 50,000 | 100,000 | 200,000 | 400,000 | 800,000 | 1,600,000 |
| COMPANY A, #2 | 30,000 | 60,000 | — | — | — | — |
| COMPANY A, #3 | 10,000 | 20,000 | 100,000 | 230,000 | 490,000 | 1,030,000 |
| COMPANY A, #4 | — | 10,000 | 60,000 | 120,000 | 240,000 | 480,000 |
| HOUSE ACCOUNTS | 10,000 | 10,000 | 20,000 | 20,000 | 30,000 | 40,000 |
| SALES NOT ELIGIBLE- FOR INCENTIVE | — | — | 20,000 | 30,000 | 40,000 | 50,000 |
| TOTAL SALES, COMPANY A | 100,000 | 200,000 | 400,000 | 800,000 | 1,600,000 | 3,200,000 |

Table 2 is an exemplary compilation of sales made annually to BE from its supplier, Company A, in which sales figures for calendar years 2001 through 2006 are attributed to the four individual sales agents involved. Table 2 lists detailed information for only one supplier company and its sales agents. It will be understood by those skilled in the art that Databases 735, 745 can contain information for all sales agents at all supplier companies. Provision can also be made in the databases for sales made to BE without an individual sales agent participating in the transaction. Such dealings are known in the prior art and are commonly known as "house accounts". It can be within the scope of embodiments of the present invention that the awards that would normally be granted to a sales agent instead, in the case of a house account transaction, be granted to the benefit of Company A itself or to a designated party within Company A other than a sales agent. Provision can also be made in the databases for sales made to BE that are determined to be ineligible, for instance, as a matter of internal policy by the management of Company A, for incentive awards to a sales agent.

The data in Table 2 can be compiled on an annual basis for the calendar years 2001 to 2006 inclusive. It will be understood by those skilled in the art that the data shown have been compiled for an exemplary overall period of time and that databases can contain information for at least the entire time period that the incentive method of the present invention may be operative. The exemplary sales figures in Table 2 have been totaled on an annual basis. It is within the scope of embodiments of the present invention to make awards on the basis of sales as summed within any suitable time period, including but not limited to daily, weekly, monthly, quarterly or other like period. It is likewise within the scope of embodiments of the present invention to make awards on the basis of sales summed without the date of the transaction being an intrinsic factor. For instance, embodiments can include summing sales for which awards are made when an appropriate quantity of sales volume has been achieved.

Certain exemplary entries in Table 2 represent sales by Company A that are not eligible for inclusion in the incentive method of the present invention as it applies to the sales agents of suppliers.

The exemplary bottom-line entries in Table 2 represent the total sales by Company A to BE over a six-year period, as recorded as entries also in Table 1. These data can be processed according to the method of the present invention to determine the applicable incentive awards.

TABLE 3

CUSTOMER PURCHASES ($) FROM BE, BY CALENDAR YEAR

| CUSTOMER | 2001 | 2002 | 2003 | 2004 | 2005 | 2006 |
|---|---|---|---|---|---|---|
| COMPANY X | 150,000 | 300,000 | 600,000 | 1,200,000 | 2,400,000 | 4,800,000 |
| COMPANY Y | 300,000 | 600,000 | 1,200,000 | 2,400,000 | 4,800,000 | 9,600,000 |
| COMPANY Z | 600,000 | 1,200,000 | 2,400,000 | 4,800,000 | 9,600,000 | 19,200,000 |
| OTHERS | 13,950,000 | 27,900,000 | 55,800,000 | 111,600,000 | 223,200,000 | 446,400,000 |
| TOTAL: ALL CUSTOMERS | 15,000,000 | 30,000,000 | 60,000,000 | 120,000,000 | 240,000,000 | 480,000,000 |

Table 3 is an exemplary compilation of purchases made by its customers from BE in the calendar years 2001 to 2006 inclusive. An exemplary series of entries document the purchases made annually by three individual customers, Companies X, Y and Z. Exemplary entries also document the cumulative annual purchases from BE by its other customers. The bottom-line entries in this example of an embodiment of the present business method document the overall annual purchases from BE by all of its customers.

Those skilled in the art will recognize that this exemplary information omits or simplifies some details of actual business operations that are not essential in the portrayal of the present invention. For instance, extending the descriptions to include the roles of inventory, accounts payable and accounts receivable in the exemplary annual sales figures, while adding realism, could lead to exemplifications that are unnecessarily more complex.

TABLE 4

AGENT PURCHASES ($) FOR COMPANY X FROM BE, BY CALENDAR YEAR

| PURCHASING AGENT | 2001 | 2002 | 2003 | 2004 | 2005 | 2006 |
|---|---|---|---|---|---|---|
| COMPANY X, #1 | 100,000 | — | — | 500,000 | 1,000,000 | 2,000,000 |
| COMPANY X, #2 | 50,000 | — | — | 400,000 | 800,000 | 1,600,000 |
| COMPANY X, #3 | — | — | — | 300,000 | 600,000 | 1,200,000 |
| HOUSE ACCOUNTS, COMPANY X | — | 300,000 | — | — | — | — |
| PURCHASES NOT ELIGIBLE FOR INCENTIVE TO PURCHASING AGENT | — | — | 600,000 | — | — | — |
| TOTAL PURCHASES, COMPANY X | 150,000 | 300,000 | 600,000 | 1,200,000 | 2,400,000 | 4,800,000 |

Table 4 is an exemplary compilation of purchases made annually for Company X from BE in which the costs of the purchases in calendar years 2001 through 2006 are attributed to the orders placed by the individual purchasing agents involved #1, #2 and #3, so that awards may be granted to these individuals. Table 4 lists detailed information for only one customer, Company X, and its purchasing agents.

Provision may also be made in the databases 735, 745 in embodiments of the present invention for purchases made by Company X that were treated as house accounts. Provision may likewise be made in the databases for purchases made by Company X that, in this example, are not to be eligible for the incentive of the present invention to be granted to individuals such as purchasing agents. The bottom-line entries in Table 4 document the overall annual purchases by Company X from BE that, in this example, cover the six successive calendar years from 2001 to 2006, inclusive.

It can be within the scope of embodiments of the present invention to consider purchasing agents of companies as parties who participate in transactions with BE and, accordingly, may be eligible to be considered as recipients of incentive awards. Purchasing Agents clearly can have a central role in effectuating and influencing business transactions. It is equally clear that their actions must not be counterproductive to their employers' interests. It is believed that some employers will allow BE to grant incentives to their purchasing agents. In embodiments of the present invention, the employer can also be eligible for consideration as the recipient of incentive awards and may decide that allowing its purchasing agents to receive incentive awards from its supplier BE is, accordingly, not counterproductive. Other employers may take the opposite view. Some categories of employers may be proscribed by applicable regulations from allowing incentives to be granted to purchasing agents. In embodiments of the present invention, a purchasing agent of a customer company may not be considered for eligibility to receive incentive grants from BE unless his or her employer authorizes the practice, for instance, by signing a form.

TABLE 5

| DESCRIPTION OF TERMS IN THE FORMULAE | SYMBOLS ASSIGNED | EXEMPLARY VALUES | |
|---|---|---|---|
| Sales to (from) BE | S | | |
| Sales by All Suppliers to BE in Year | $S^s 1$ | $10,000,000 | |
| Sales by Supplier Company A to BE in Year 2001 | $S^A 1$ | $100,000 | |
| Sales by Supplier Company A Agents to BE in Year 2001 | $S_1^{Aa}$ | $100,000 | |
| Sales by BE to All Customers in Year 2001 | $S_1^c$ | $15,000,000 | |
| Sales by BE to Customer Company X in Year 2001 | $S_1^X$ | $150,000 | |
| Sales by BE to Customer Company X through Purchasing Agents in Year 2001 | $S_1^{Xp}$ | $150,000 | |
| Fraction of Equity Value Granted by BE to All Parties | F | 0.03 | (3%) |
| Fraction of Equity Value Granted by BE to Suppliers in Year 2001 | $F_1^s$ | 0.03 × 0.15 | (0.45%) |
| Fraction of Equity Value Granted by BE to Suppliers' Agents in Year 2001 | $F_1^a$ | 0.03 × 0.05 | (0.15%) |
| Fraction of Equity Value Granted by BE to Customers in Year 2001 | $F_1^c$ | 0.03 × 0.60 | (1.80%) |
| Fraction of Equity Value Granted by BE to Customers' Purchasing Agents in Year 2001 | $F_1^P$ | 0.03 × 0.20 | (0.60%) |
| Market Value in Year 2006 of BE, in Value of Which Awards Made in Year 2001, | $M_{1,6}$ | $240,000,000 @ 1 × Sales | $2,400,000,000 @ 10 × Sales |
| Incentive Granted to All Parties in Year 2001, as Cashed-in in Year 2006 | $I_{1,6}$ | $7,200,000 | $72,000,000 |
| Incentive Granted to All Suppliers in Year 2001, as Cashed-in in Year 2006 | $I_{1,6}^s$ | $1,080,000 | $10,800,000 |
| Incentive Granted to Supplier Company A in Year 2001, as Cashed-in in Year 2006 | $I_{1,6}^A$ | $10,800 | $108,000 |
| Incentive Granted to Supplier Company A Agents in Year 2001, as Cashed-in in Year 2006 | $I_{1,6}^{Aa}$ | $3,600 | $36,000 |
| Incentive Granted to All Customers in Year 2001, as Cashed-in in Year 2006 | $I_{1,6}^c$ | $4,320,000 | $43,200,000 |
| Incentive Granted to Company X in Year 2001, as Cashed-in in Year 2006 | $I_{1,6}^X$ | $43,200 | $432,000 |
| Incentive Granted to Company X Purchasing Agents in Year 2001, as Cashed-in in Year 2006 | $I_{1,6}^{Xp}$ | $14,400 | $144,000 |

Superscripts designate parties to transactions: $^s$= supplier; $^a$= supplier sales agent; $^c$= customer; $^P$= purchasing agent of customer; $^A$= Company A; $^X$= Company X
Subscript numerals designate calendar years: $_1$= 2001; $_2$= 2002; $_3$= 2003; $_4$= 2004; $_5$= 2005; $_6$= 2006

Table 5 contains a description of the terms used in formulae that can serve to determine awards in those embodiments of the present invention in which the chosen investment vehicle is in an entity in which the program administrator can issue dilutive instruments of ownership. In the present example, BE is making the incentive awards in shares of its own, publicly traded stock.

The subject matter of Table 5 includes a continuation of the examples of business-to-business transactions presented in Tables 1–4. In addition to the financial and time data contained in the databases, and depicted schematically in Tables 1–4, it can be necessary in the operation of the present invention for calculating and processing formulae to be established and for numerical values to be specified for the algebraic terms in these formulae. In embodiments in which more than one transacting party in a transaction is a recipient, it can be necessary to apportion to each recipient an appropriate portion of the total award.

Referring to Table 5, superscript letters designate transacting parties, as listed. Similarly, subscript numerals designate calendar years, as listed. Descriptions of terms in this example of use of the formulae include algebraic symbols for: sales (S) to and from BE in calendar year 2001; sales ($Ss_1$) by all suppliers to BE in calendar year 2001; sales ($S^A{}_1$) by supplier Company A to BE in calendar year 2001; sales ($S^{Aa}{}_1$) by supplier Company A agents to BE in 2001; sales ($S^c{}_1$) by BE to all customers in 2001; sales ($S^X{}_1$) by BE to customer Company X in 2001; and, sales ($S^{Xp}{}_1$) by BE to customer Company X through purchasing agents in 2001. Exemplary values for the above terms are listed in Table 5, said values matching the corresponding entries in Tables 1–4. The series of exemplary values representing sales by agents #1, 2, 3 and 4 of supplier Company A in Table 2, are combined in Table 5 as sales by all agents for Company A. The series of exemplary values representing purchases by individual purchasing agents #1, 2 and 3 for customer Company X in Table 4, are combined in Table 5 as purchases by all purchasing agents for Company X. Further algebraic symbols used in this embodiment of the present invention include the fraction (F) of the value of the equity granted overall in calendar year 2001, specifically to Suppliers ($F^s{}_1$), to Suppliers' Agents ($F^a{}_1$), to Customers ($F^c{}_1$) and Customers' Purchasing Agents ($F^p{}_1$); the Market Value of the Entity chosen as the award in this example in calendar year 2001 that can be cashed-in in calendar year 2006 ($M_{1,6}$); and, the Amount of the Incentive Award earned by all recipients in calendar year 2001 that can be cashed-in in calendar year 2006 ($I_{1,6}$). This exemplary overall Incentive Award ($I_{1,6}$) is apportioned to Suppliers ($I^s{}_{1,6}$), to Supplier Company A ($I^A{}_{1,6}$), to Agents of Company A ($I^{Aa}{}_{1,6}$), to Customers ($I^c{}_{1,6}$), to Customer Company X ($I^X{}_{1,6}$), and to the Purchasing Agents of Customer Company X ($I^{Xp}{}_{1,6}$). The symbols assigned to these terms are summarized in Table 5 together with exemplary financial and numerical values assigned to the terms in this example.

A general formula for the total fraction ($F^x{}_y$) of ownership granted in a given year (y) to as many as n categories of recipients (x) can be written:

$$F_y = \Sigma_{x=1 \text{ to } n} F^x{}_y$$

The above formula for the exemplary case of awards in calendar year 2001 to four categories of recipients, namely suppliers, suppliers' sales agents, customers and purchasing agents of customers, may be written:

$$F_1 = F^s{}_1 + F^c{}_1 + F^a{}_1 + F^p{}_1$$

In the example of the embodiment of the present invention depicted in Table 5 values have been selected for the terms in the above formula that apportion a distribution of instruments of ownership in the chosen vehicle for investment between the recipients. Further, $F_1$ has been selected so as to be large enough to be a valuable incentive yet not so large as to cause excessive dilution if the awards are cashed-in by issuing shares, nor to involve the management of the entity in which the awards have been granted in excessive costs if it chooses to fulfill the incentive grants by repurchasing shares in the open market so as to minimize dilution.

In light of the above, the following exemplary values have been selected, whereby 3% of the equity in the chosen vehicle for investment is distributed as the overall incentive grant for transactions occurring in calendar year 2001:

| | | | |
|---|---|---|---|
| $F_1$ | = | 0.03 | (3.00% to all recipients in 2001) |
| $Fs_1$ | = | 0.03 × 0.15 | (0.45% to suppliers in 2001) |
| $Fc_1$ | = | 0.03 × 0.60 | (1.80% to customers in 2001) |
| $Fa_1$ | = | 0.03 × 0.05 | (0.15% to suppliers' sales agents in 2001) |
| $Fp_1$ | = | 0.03 × 0.20 | (0.60% to customers' purchasing agents in 2001) |

This exemplary apportionment values the role of the customers and of their purchasing agents more highly than the role of the suppliers and their sales agents. Those skilled in the art will recognize that selection of the most appropriate overall value of F in each period of operation, and optimally distributing the incentive awards between the various transacting parties in the various markets and under various business conditions, represent important, effective, novel and useful aspects of the present invention.

In this example of an embodiment of the present invention, BE is chosen as the vehicle in which awards are granted. In embodiments of the present invention, in order to calculate the value of the awards when they are cashed-in in calendar year 2006 it can be necessary to know the Market Capitalization Value of BE at that time. This Value in actual practice, since in this example BE shares are traded on a Stock Exchange, will vary from day to day throughout calendar year 2006 and can be expected to depend upon a broad range of business factors. An exemplary estimate of the Market Capitalization Value of BE in 2006 can be made by reference to its earnings or to its sales volume, as known to those skilled in the art. To establish a Value in 2006, we will refer to BE's performance in the immediately prior full calendar year 2005 and we will confine our study to sales volume since the company's profits have not been the subject of exemplary presentation. In the present example, BE has projected sales of $240,000,000 in 2005, as recorded as a bottom-line entry in Table 3.

Market Values of companies with shares trading on the Nasdaq stock exchange and that are involved in emerging markets, and especially in Internet markets, have ranged as high as one hundred times Sales. That is, a company with annual sales of $10 million has in some cases had its Market Capitalization (share price multiplied by number of shares outstanding) on a stock market valued at $1,000 million. Two more conservative exemplary estimates of the Market Value of BE in 2006 ($M_{1,6}$) will be considered, based on 1× and 10× prior year Sales, in this example the prior year being 2005 in which sales of $240,000,000 were made. If BE is able to achieve a profit margin of 10%, the two exemplary estimates of ($M_{1,6}$) translate to Price-to-Earnings (P/E) ratios of 10 and 100. Stock market valuations of profitable, growth companies are generally in the P/E range 25 to 100.

Accordingly, as also summarized in Table 5 (with 'Sales' meaning 'prior year Sales'):

| | | |
|---|---|---|
| The value of $M_{1,6}$ @ 1 × Sales | = | $240,000,000 |
| The value of $M_{1,6}$ @ 10 × Sales | = | $2,400,000,000 |

Based on the above, the total value of incentive awards $I_{1,6}$ granted in 2001 that may be cashed-in in 2006 may be written (with 'Sales' meaning 'prior year Sales'):

$$(I_{1,6} @ 1 \times \text{Sales}) = F_1 \times (M_{1,6} @ 1 \times \text{Sales})$$
$$= 0.03 \times \$240,000,000$$
$$= \$7,200,000$$

$$(I_{1,6} @ 10 \times \text{Sales}) = F_1 \times (M_{1,6} @ 10 \times \text{Sales})$$
$$= 0.03 \times \$2,400,000,000$$
$$= \$72,000,000$$

Table 5 lists the value of the incentives determined for the various parties to business transactions conducted in year 2001 and cashed-in in 2006 with the two different exemplary Market Values.

In this example, the incentive grant cashed-in in 2006 by suppliers, based on the awards they received in 2001 for supplying $10,000,000 worth of products or services, amounts to $1,080,000 if the Market Value of BE is equal in 2006 to $240,000,000, that is equal to 1× its prior year sales. Thus, in this example the size of the incentive grant is quite considerable, possibly of much the same value as the profit earned by the suppliers when making the $10,000,000 worth of sales to BE in 2001.

If the Market Value of BE is instead the second exemplary figure, $2,400,000,000 in 2006, that is equal to 10× its prior year sales, the incentive grant the suppliers cash-in in 2006 amounts to $10,800,000. In this case the incentive is of much the same amount as the sales made five years earlier and thus represents an extremely large benefit to the recipients.

As illustrated in the present example in Table 5, the benefits ($I^A_{1,6}$) to an individual supplier such as Company A likewise can range from quite considerable to extremely large, depending on the market value of BE in 2006. The value of the incentive payable to Company A has been based on their sales ($S^A_1$) to BE in 2001 relative to the sales in that year made by all suppliers ($S^s_1$) in this category of merchandise to BE, that is, in the ratio ($S^A_1 \div S^s_1$) and the incentives that may be cashed-in by supplier Company A can be written:

$$(I^A_{1,6} @ 1 \times \text{Sales}) = (S^A_1 \div S^s_1) \times F^s_1 \times (M_{1,6} @ 1 \times \text{Sales})$$
$$= (\$100,000 \div \$10,000,000) \times 0.045 \times$$
$$\$240,000,000$$
$$= \$10,800$$

$$(I^A_{1,6} @ 10 \times \text{Sales}) = (S^A_1 \div S^s_1) \times F^s_1 \times (M_{1,6} @ 10 \times \text{Sales})$$
$$= (\$100,000 \div \$10,000,000) \times 0.045 \times$$
$$\$2,400,000,000$$
$$= \$108,000$$

Also referring to Table 5, the benefits to the sales agents at supplier Company A, $I^{Aa}_{1,6}$, are in this example $3,600 or $36,000 depending on the valuation of BE in 2006.

The scale of the benefit that can be achieved by the method of the present invention in this exemplary embodiment is apparent from examining in Table 5 the value of the awards made in 2006 that may be cashed-in by the customers of BE, a category of recipient that has been selected to be particularly favored in the incentive formulae of the present example. Based on purchases by all customers from BE of $15,000,000 in 2001, awards eligible in this example to be cashed-in in 2006 amount to $4.32 million or $43.2 million, depending on the valuation of BE in 2006 as either 1× or 10× prior year sales. The benefits in 2006 to individual Customer X, based on purchases of $150,000 in 2001, are $43,200 or $432,000 depending on the valuation of BE in 2006. The benefits in 2006 to the purchasing agents at Customer X, who handled procurement in 2001 of $150,000 worth of products or services, are $14,400 or $144,000 depending once again on the valuation of BE in 2006.

TABLE 6

AN EMBODIMENT OF THE INCENTIVE METHOD IN THE RESIDENTIAL REAL ESTATE MARKET

| | CALENDAR YEAR (YEAR OF OPERATION) | | | | | |
|---|---|---|---|---|---|---|
| | 2001 (1) | 2002 (2) | 2003 (3) | 2004 (4) | 2005 (5) | 2006 (6) |
| Number of Homes Sold @ $200,000 each | 10,000 | 20,000 | 30,000 | 40,000 | 50,000 | 60,000 |
| Value of Homes Sold | $2 billion | $4 billion | $6 billion | 8 billion | $10 billion | $12 billion |
| Value of Commission @ 6% | $120 million | $240 million | $360 million | $480 million | $600 million | $720 million |
| Fee to IBMCo @ 1% of Sales | $20 million | $40 million | $60 million | $80 million | $100 million | $120 million |
| Market Value (M) of IBMCo @ 100 × Prior Year Fee Receipts (M @ 100 × Fees) | N/A | $2 billion | $4 billion | $6 billion | $8 billion | $10 billion |
| Total Incentive Payments in 2006 for 2001 Sales, Based on 4% of ($M_{1,6}$ @ 100 × Fees) | | | | | | $400 million |
| 1% point to Home Seller | | | | | | $100 million |
| 1% point to Home Buyer | | | | | | $100 million |
| 1% point to Listing Real Estate Agent/Agency | | | | | | $100 million |
| 1% point to Buyer's Real Estate Agent/Agency | | | | | | $100 million |
| Incentive Payment in 2006 per Home Sold in 2001, Based on 4% of ($M_{1,6}$ @ 100 × Fees) | | | | | | $40,000 |
| 1% point to Home Seller | | | | | | $10,000 |
| 1% point to Home Buyer | | | | | | $10,000 |
| 1% point to Listing Real Estate Agent/Agency | | | | | | $10,000 |
| 1% point to Buyer's Real Estate Agent/Agency | | | | | | $10,000 |

Embodiments of the method of the present invention can also be effective in business transactions involving consumers. Table 6 contains exemplary figures derived from applying an embodiment of the incentive method of the present invention in the residential real estate market. The subject matter of Table 6 includes an exemplary number and value of residential real estate sales made over a six-year period and the value of commissions generated thereby. The numbers of homes sold in the years 2001 through 2006 inclusive measure the incremental increase in sales achieved in a particular market as a result of introducing the incentive of the present invention at the beginning of year 1, that is at the beginning of calendar year 2001. For exemplary purposes, the value of each home sold throughout the six-year period is $200,000. The number of homes sold in the first year of operation of this embodiment of the incentive method is selected for exemplary purposes to be 10,000 and is further selected to grow in increments of 10,000 homes in each of the following years. Accordingly, the total value of the homes sold annually increases from $2 billion in year 1 to $12 billion in year 6. The value of commission earned, for instance, by one or more real estate agents, and their agencies if applicable, involved in the transactions can be any reasonable amount. In this example, a total commission of 6% of the property value of each home is earned. Accordingly, as shown in entries in Table 6, commissions of $120 million are earned in 2001 and they increase progressively to a value of $720 million in 2006.

The sale of each of the homes may involve a real estate listing agent, who may be affiliated with a real estate listing agency. Also, another real estate agent may be involved, possibly affiliated with a real estate agency, who finds a buyer for the property. In this example, the listing real estate company enters into a contract with a company offering the incentive of the present invention ("the Incentive Business Method Company, IBMCo") as a result of the parties agreeing on mutually acceptable terms. The listing real estate company expects to gain market share as a result of offering awards in a chosen vehicle for investment to at least one party involved in the transactions and agrees to pay fees, shown in Table 6, to IBMCo equal to 1% of the value of each property sold. IBMCo offers prospective recipients a choice of investment entities in which to receive incentive awards that may include in this example, for instance, equity in IBMCo itself, shares in a choice of mutual funds, establishment of a savings or money market account and such other choices as it may see fit to offer.

In this example of an embodiment of the present invention, each of the recipients in all of the transactions choose to receive equity in IBMCo as their incentive award. IBMCo may, as part of the terms of the incentive grant, indicate to the recipients that their awards can be eligible to be cashed-in after a time elapse of five years. For exemplary purposes, the market value (M) of the IBMCo during a particular calendar year is taken as 100 times its prior year fee receipts from said listing real estate company. This market value, which may be written M @100× Fees, is determined from the data listed in Table 6 to be $10 billion in Year 6. It is assumed in this example that IBMCo contractually agreed with the listing real estate company that awards eligible to be cashed-in in Year 6 for sales made in Year 1 would amount to 4% of its market value in Year 6, that is 4% of ($M_{1,6}$ @ 100× Fees). Referring to the data in Table 6, the value of 4% of ($M_{1,6}$ @ 100× Fees) is $400 million. In this example, therefore, $400 million represents the total value of incentive awards cashed-in in 2006 based on grants made in 2001.

TABLE 7

AN EMBODIMENT OF A PERIODIC ACCOUNT STATEMENT

STATEMENT OF
INCENTIVE AWARDS GRANTED BY: OWNER OF PORTAL #1234
ACCOUNT: COMPANY P
CUSTOMER #: P-321  DATE: Apr. 15, 2006
CURRENT TRANSACTIONS: PERIOD: Jan. 1, 2006 through Mar. 31, 2006

| DATE OF TRANSACTION | INVOICE # | INVOICE $ | INVESTMENT VEHICLE |
|---|---|---|---|
| Jan. 10, 2006 | P110-2006 | $10,000.00 | 1234-1 |
| Feb. 14, 2006 | P214-2006 | $18,000.00 | 1234-1 |
| Mar. 06, 2006 | P306-2006 | $14,000.00 | 1234-1 |
| TOTAL | | $42,000.00 | 1234-1 |

NOTES:
0.7119075% of Equity in Investment Vehicle #1234-1 will be awarded to all recipients for their transactions in calendar year 2006.
1st Quarter, 2006 transactions by all recipients: $160,000,000
Incentive awards made in 2006 may be cashed-in in 2011
Investment Vehicle #1234-1 currently has 10,000,000 shares outstanding
Your incentive award for transactions in 1st Quarter, 2006: 0.007119075 × (42,000 ÷ 160,000,000) × 10,000,000 = 18.6876 SHARES of #1234-1

Table 7 depicts an embodiment of a periodic account statement. In this exemplary case, the statement covers incentive grants made to a customer of a company (Company P) that transacts business on the Internet Portal site. For identification purposes the customer is designated as #P-321. Company P has entered into a contract with the Owner of Portal #1234 whereby, in return for fees paid to said Owner, the Owner issues periodic statements and makes disbursements to cash-in awards made by Company P to its customers.

For exemplary purposes, the statement is issued on Apr. 15, 2006 and covers transactions made by customer #P-321 in the prior calendar quarter, Jan. 1, 2006 through Mar. 31, 2006. The data listed in Table 7 under the following headings can represent sufficient information about the transactions for the incentive awards to be determined: date of transaction between customer #P-321 and company P, invoice #, invoice amount and vehicle for investment chosen by customer #P-321. In fact, in this example, many of the details concerning each transaction listed in Table 7 can serve primarily to provide an accounting record for the parties involved. In this embodiment, only the summary data in Table 7, namely that in the first quarter of calendar year 2006 purchases of $42,000.00 were made by customer #P-321 from company P and that vehicle for investment #1234-1 has been selected by customer #P-321, will be used in calculating the amount of the award granted to #P-321 by the owner of portal #1234.

Notes in Table 7 can provide information to customer #P-321 concerning factors that may be involved in the value of the awards, namely: the overall share in the equity of investment vehicle #1234-1 that is being awarded for transactions in calendar year 2006, the transactions by all recipients in the first quarter of 2006, the fact that awards made in 2006 will be eligible to be cashed-in in 2011 and the fact that investment vehicle #1234-000 currently has 10,000,000 shares outstanding.

Further referring to the example depicted in Table 7, customer #P-321 is provided with a statement of the number of shares awarded in investment vehicle #1234-1 based on transactions made in the first quarter of calendar year 2006.

The fraction, F, of ownership in an investment vehicle granted to recipients in a given year was the subject of exemplary description in the incentive formulae depicted in Table 5. In that example $F_1$, the fraction of ownership rights granted in the year 2001, was selected to be 3% (0.03). In the example depicted in Table 7, customer #P-321 is informed that the fraction of ownership granted in investment vehicle #1234-1 for transactions in calendar year 2006 is 0.7119075% (0.007119075). It can be within the scope of the present invention that the grantor of ownership rights can use any or no basis to select the fraction of ownership rights granted in a period. The fraction can be arbitrarily chosen, and the relationship between the grants made in successive periods can likewise be arbitrary.

However, it can also be within the scope of the present invention to calculate the fractions of equity granted in successive periods on the basis of one or other mathematical formula. The use of a formula can provide a clear disclosure to participants in the incentive method of the fractions of equity that may be granted in some vehicles for investment in successive periods.

In some embodiments of the present invention, business purposes may well be served by use of a formula that provides for more generous fractions of equity to be granted early in the incentive program. It may further be useful if a formula places an upper limit on the overall grant of equity made, no matter in how many periods the grants may continue to be made.

An embodiment of the present invention is to determine successive grants of the fraction of ownership by use of the formula:

$$F_n = F_1 R^{n-1}$$

in which $F_1$ is the fraction of ownership rights in a selected investment vehicle granted in the first period of use of the method, R is the multiplier selected by the grantor by which the fraction of ownership rights granted changes in successive periods and n is the current period since the onset of use of the method.

TABLE 8

EMBODIMENTS OF THE FORMULA FOR DETERMINING SUCCESSIVE GRANTS OF EQUITY AWARDS FRACTION (F) OF OWNERSHIP GRANTED IN SUCCESSIVE PERIODS (n) BY APPLYING FORMULA $F_n = F_1 R^{n-1}$

| | ANNUAL FRACTION, $F_n$ | | PERIOD, |
|---|---|---|---|
| | (with $F_1$ = 0.03, R = 0.75) | (with $F_1$ = 0.05, R = 0.50) | n (YEAR) |
| $F_1$ | 0.03 | 0.05 | 1  2001 |
| $F_2$ | 0.0225 | 0.025 | 2  2002 |
| $F_3$ | 0.016875 | 0.0125 | 3  2003 |
| $F_4$ | 0.0126562 | 0.00625 | 4  2004 |
| $F_5$ | 0.0094921 | 0.003125 | 5  2005 |
| $F_6$ | 0.007119075 | 0.0015625 | 6  2006 |

ASYMPTOTIC LIMIT, L $L = F_1 \div (1 - R)$
(with $F_1$ = 0.03, R = 0.75)   (with $F_1$ = 0.05, R = 0.50)
$L = 0.12$                      $L = 0.10$ Table 8 depicts embodiments of the formula for determining successive grants of ownership rights for the two exemplary instances in which, firstly, $F_1$=3% (0.03) and R=0.75, and, secondly, $F_1$=5% (0.05) and R=0.50. In these examples, successive periods 1 through 6 have been selected to be calendar years, 2001 through 2006.

Referring to Table 8, the grants determined by the two exemplary uses of the formula for the first period are 0.03 and 0.05 respectively. In both examples employing fractional values for R, 0.75 and 0.50 respectively, leads to declining grants of equity in successive periods. The effect in the formula of employing R=0.75 is that the grant of equity in each successive period is three-quarters that made in the immediately previous period. Likewise, grants made according to the formula employing R=0.50 diminish by 50% in successive periods. In Table 8, for the series F determined with $F_1$=0.03 and R=0.75, $F_1$ in 2001 is 0.03 and $F_6$ in 2006 is 0.007119075. These calculated fractions, $F_1$ and $F_6$, are identical to values cited earlier, namely $F_1$ in 2001 in Table 5 and $F_6$ in 2006 in Table 7, indicating that all of these exemplary fractions of grants of equity have been determined by using the above formula with $F_1$=3% (0.03) and R=0.75.

In the special case of the multiplier R being a positive number, greater than zero and less than one, the sum of the terms in the formula $F_n = F_1 R^{n-1}$ from the period n=1 for an unlimited number of successive periods approaches but never exceeds an asymptotic limit, L.

It can be determined algebraically that the formula defining L is:

$$L = \Sigma_{n=1\ to\ \infty} F_1 R^{n-1} = F_1 \div (1-R)$$

Applying this formula to determine the maximum award of equity that could be granted in the examples of Table 8, the asymptotic limit in the case of $F_1$=0.03, R=0.75 is calculated to be 0.12 and in the case of $F_1$=0.05, R=0.50 is calculated to be 0.10. That is, granting an award of 3% of the equity of an investment vehicle in the first period of operation of the incentive method and reducing the award in successive periods to 75% of that in the immediately previous period will lead to no more than 12% of the equity being granted in no matter how many years the program is operative. Similarly, granting an award of 5% of the equity of an investment vehicle in the first period of operation and successively halving the award will lead to no more than 10% of the equity being granted. It will be understood by those skilled in the art that other than the exemplary values can be selected for $F_1$ and R and that other effective asymptotic limits and other effective sequences of successive grants can be generated thereby.

awarded per year and the market value of the chosen vehicle. In Table 9, the fraction of equity awarded annually is as listed in the example of Table 8 in which $F_1$=0.03 and R=0.75. Further referring to Table 9, under the heading 'INVESTMENT VEHICLE', in calendar years 2001, 2003, 2004 and 2005, vehicle for investment #1234-1 was chosen, whereas in 2002 vehicle for investment #1234-2 was chosen.

The data enable the number of shares in, and the value of, customer #P-321's awards to be calculated and listed in Table 9, effective as of Mar. 31, 2006, being based on the number of shares outstanding in, and the market value of, the

TABLE 9

AN EMBODIMENT OF A PERIODIC VALUATION STATEMENT

STATEMENT OF:
INCENTIVE AWARDS GRANTED BY: OWNER OF PORTAL #1234
ACCOUNT: COMPANY P (Customer #P-321)          DATE: Apr. 15, 2006
PRIOR YEAR TRANSACTIONS:                       PERIOD: Calendar Years 2001 through 2005

| CALENDAR YEAR | INVOICE TOTAL | INVESTMENT VEHICLE | ANNUAL SALES OF INVESTMENT VEHICLE | % OF EQUITY GRANTED | MARKET VALUE* OF INVESTMENT VEHICLE | ESTIMATE OF YOUR INCENTIVE AWARDS AS OF Mar. 31, 2006 ¶ | |
|---|---|---|---|---|---|---|---|
| | | | | | | # OF SHARES | VALUE |
| 2001 | $78,000.00 | 1234-1 | $20,000,000 | 3.0000000% | $320,000,000 | 1170.0 | $37,440 |
| 2002 | $88,000.00 | 1234-2 | $400,000,000 | 2.2500000% | $3,200,000,000 | 247.5 | $15,840 |
| 2003 | $102,000.00 | 1234-1 | $80,000,000 | 1.6875000% | $320,000,000 | 215.2 | $6,885 |
| 2004 | $114,000.00 | 1234-1 | $160,000,000 | 1.2656200% | $320,000,000 | 90.2 | $2,886 |
| 2005 | $136,000.00 | 1234-1 | $320,000,000 | 0.9492100% | $320,000,000 | 40.3 | $1,291 |

(1)

| INVESTMENT VEHICLE | SHARE CLOSING BID PRICE | NUMBER OF SHARES OUTSTANDING | MARKET VALUE |
|---|---|---|---|
| 1234-1 | $32.00 | 10,000,000 | $320,000,000 |
| 1234-2 | $64.00 | 50,000,000 | $3,200,000,000 |

*INVESTMENT VEHICLE MARKET VALUE BASED ON NASDAQ SHARE PRICES ON Mar. 31, 2006
¶FORMULA FOR ESTIMATED VALUE OF YOUR INCENTIVE AWARDS
(INVOICE TOTAL ÷ ANNUAL SALES OF INVESTMENT VEHICLE) × (% OF EQUITY GRANTED) × (MARKET VALUE OF INVESTMENT VEHICLE)

Table 9 is an embodiment of a periodic valuation statement. The data in Table 9 are a continuation of the data in the example of a periodic account statement shown in Table 7. Accordingly, the statement involves grants made by the owner of portal #1234, the statement is the account of company P's customer #P-321 and the statement is issued on Apr. 15, 2006. The statement covers prior year transactions, occurring in calendar years 2001 through 2005.

The data contained in Table 9 enable valuations of incentive awards to be determined for an embodiment of the present invention in which; firstly, the awards are made only to the recipient category of 'customers', and; secondly, the awards are allocated in proportion to the financial value of transactions by any given customer as it relates to the total value of transactions that involved other customers who chose the same vehicle for investment as that selected by the customer #P-321. Accordingly in Table 9, information is tabulated concerning the calendar year in which transactions occurred, the yearly total of invoices covering transactions in which customer #P-321 was a transacting party, the chosen vehicle for investment for awards to customer #P-321 in each of the calendar years, the annual volume of sales made in the course of its overall business operations by the chosen vehicle for investment, the proportion of equity relevant vehicles for investment as of that date. In this example of an embodiment of the present invention, both vehicles for investment #1234-1 and #1234-2 are publicly traded on the Nasdaq stock exchange. Thus, referring to Table 9, the closing bid price of shares and the number of shares outstanding are known, from which the market value of #1234-1 and #1234-2 can readily be determined.

Application of the 'FORMULA FOR ESTIMATED VALUE OF YOUR INCENTIVE AWARDS' leads to derivation of the number of shares awarded to customers in years 2001 through 2006 and to their estimated values as of Mar. 31, 2006, the date on which the market data were taken. The estimated value of $37,440 listed in Table 9 was, in fact, the actual value of the 1,170 shares awarded to customer #P-321 during calendar year 2001 as of the close of the Nasdaq stock exchange on Mar. 31, 2006 and the shares could have been cashed-in at that time for that amount. In an embodiment of the present invention, these shares can be cashed-in at any time during calendar year 2006. In a further embodiment of the present invention, the awards expire worthless if they are not cashed-in within the assigned period.

TABLE 10

AN EMBODIMENT OF DISBURSEMENT OF AN INCENTIVE AWARD

| | |
|---|---|
| STATEMENT OF DISBURSEMENT BY: | OWNER OF PORTAL #1234 |
| ACCOUNT NAME: | CUSTOMER #P-321 |
| DISBURSEMENT IS BEING MADE OF OWNERSHIP RIGHTS IN: | INVESTMENT ENTITY #1234-1 (EARNED CALENDAR YEAR 2001) |
| YOUR DISBURSEMENT ORDER: | CASH-IN 60% OF THESE RIGHTS |
| A/C BALANCE BEFORE DISBURSEMENT: | 0.000117 OF MARKET VALUE #1234-1 |
| DATE OF DISBURSEMENT: | CLOSE OF BUSINESS, Mar. 31, 2006 |
| CURRENT MARKET VALUE OF #1234-1: | $320,000,000.00 $32.00 PER SHARE × 10 million shares |
| DISBURSEMENT ORDER IS FOR (CHECK): | |
| ALL RIGHTS | |
| FRACTION OF CASHABLE RIGHTS | X |
| FRACTION YOU ORDERED CASHED-IN | 60% |
| DISBURSEMENT IS: | 60% × 0.000117 × $320.000,000 = $22,464.00 |
| A/C BALANCE AFTER DISBURSEMENT: | 40% × 0.000117 = 0.0000468 fraction of MARKET VALUE of Vehicle for Investment #1234-1 |

NOTES:
1) A TRANSFER IN THE AMOUNT OF $22,464.00 HAS BEEN CREDITED
2) SHARES IN VEHICLE FOR INVESTMENT #1234-1 MAY NOW BE CASHED IN. THEY HAVE A MARKET VALUE AS OF Mar. 31, 2006 OF $14,976.00.
3) THESE SHARES EXPIRE WORTHLESS UNLESS CASHED-IN ON OR BEFORE Dec. 31, 2006.
DATE OF THIS NOTICE: Mar. 31, 2006

In a continuation of the exemplary data of Table 9, Table 10 depicts an embodiment of disbursement of an incentive award. In this example, the disbursement is provided by the owner of Portal #1234, to effect a disbursement to customer #P-321.

The disbursement is occasioned by the cashing-in of equity awards in vehicle for investment #1234-1 that were granted in calendar year 2001. The disbursement can be made in response to a cashing-in order entered with the owner of Portal #1234 by customer #P-321 in which, for example, 60% of the eligible account balance is to be cashed in at close of business on Mar. 31, 2006. The account balance before cashing in is shown in Table 10, namely a 0.000117 share in the market value of vehicle for investment #1234-1.

Confirmation can be provided in the disbursement statement that cashing-in of the shares took place on Mar. 31, 2006 and the market value at close of business on the cashing in date can be recorded. Confirmation can also be provided that, in this example, the customer did not cash-in all eligible shares. Rather, that a fraction of the available balance, namely 60%, was cashed-in. The disbursement is accordingly, as listed in Table 10, in the amount of $22,464.00. The account balance after the disbursement is listed. It is stated in terms of the fraction (0.0000468) of the market value of #1234-1 that is now owned since the precise monetary value of the balance in the account is determined when the remaining shares are cashed-in.

The disbursement notice of Table 10 concludes by confirming the transfer of the disbursed funds to customer #P-321's bank account; by advising the customer that further shares remain in the account; by advising that, in this embodiment of the present invention, the shares expire worthless on a date certain, and; by listing the date of the notice. In this example, the incentive awards are cashed-in by direct communication between the recipient and the provider. In embodiments of the present invention, the procedure of cashing-in and disbursement can involve the provider issuing shares and selling them on a stock exchange in order to secure funds to disburse to the recipient. Embodiments of cashing-in and disbursement can involve the provider periodically issuing a block of shares and selling them on a stock exchange thereby securing a monetary sum from which appropriate funds can be disbursed as necessary to recipients cashing-in their incentive awards.

It will be appreciated by those skilled in the art that various substitutions may be made to those embodiments described herein without departing from the spirit and scope of the present invention.

What is claimed is:

1. A computer based method for carrying out an incentive award program by a business entity comprising the steps of:
   a. participating in a quantifiable transaction, the quantifiable transaction having at least two transacting parties,
   b. determining at least one of the transacting parties to be a recipient of an incentive award offered by the business entity,
   c. choosing as the incentive award an investment vehicle that is equity in the incentive award program,
   d. calculating the incentive award according to the formula:

$$F_n = F_1 R^{n-1},$$

where
   n is the current period since the onset of carrying out the method;
   $F_1$ is the fraction of ownership rights in the chosen equity provided to the recipient in the first period of carrying out the method;
   $F_n$ is the fraction of ownership rights in the chosen equity provided to the recipient in the current period of carrying out the method;
   R is a multiplier fraction greater than zero and less than one by which the provided fraction of ownership rights changes in successive periods;
   e. providing the chosen incentive award to the recipient,
   f. carrying out steps a–e using at least one computer processor and at least one computer storage means, wherein the business entity is selected from the group consisting of the owner of the incentive award program and an authorized operator of the incentive award program.

2. The method of claim 1, wherein participating is selected from the group consisting of: participating only by carrying out the incentive award program and participating not only by carrying out the incentive award program but additionally as a transacting party.

3. The method of claim 1, wherein the transacting party comprises any entity engaging in a quantifiable transaction, the transaction characterized by the business entity providing an incentive award.

4. The method of claim 1, wherein at least two of the transacting parties are recipients, and wherein a total incentive award for the quantifiable transaction is the sum of all incentive awards provided to each recipient in the transaction, the business entity determining the portion of the total award provided to each recipient.

5. The method of claim 1, wherein at least one of the transacting parties pays a fee to the business entity, the transacting party acting as a supplier to a customer and the customer being provided an incentive award by the business entity.

6. The method of claim 5, wherein at least one real estate agent becomes a transacting party by paying a fee to the business entity, and wherein the business entity provides the incentive award to at least one recipient, the at least one recipient being selected from the group consisting of the seller of the property, the buyer of the property, the lessor of the property, the lessee of the property, the real estate agent for the seller, the real estate agent finding the buyer, the real estate agency listing the property, the multiple listing service provider, the real estate agency with which the agent finding the buyer is affiliated, and the real estate agency with which the agent representing the seller is affiliated.

7. The method of claim 1, wherein determining at least one of the transacting parties to be a recipient comprises the business entity choosing which of the transacting parties are to be encouraged to engage in the quantifiable transaction.

8. The method of claim 1, wherein the recipient designates at least one other party to receive at least a part of the recipient's incentive award, said other party comprising any entity.

9. The method of claim 1, wherein the investment vehicle that is equity in the incentive award program is selected from the group consisting of options, warrants, restricted stock, shares of common stock, shares of preferred stock and shares of tracking stock.

10. The method of claim 1, wherein the incentive award gets larger as the value of the quantifiable transaction gets larger.

11. The method of claim 1, wherein the value of the quantifiable transaction comprises the total revenue amount of the transaction.

12. The method of claim 10, wherein a larger incentive award is provided when at least two measures of the transaction are more valuable to the business entity, said measures selected from the group consisting of profitability of the transaction to the business entity, the transaction's total revenue amount and at least one parameter indicative of geographical location related to the transaction.

13. The method of claim 1, wherein the amount of the incentive award is based upon the value of the transaction for which the award is granted, said transaction occurring within a predefined period, relative to the total value of all transactions for which incentive awards were awarded during the predefined period.

14. The method of claim 1, wherein a ratio between the value of the incentive award and the value of the quantifiable transaction remains in effect for a predefined period of time, and wherein a larger incentive award is provided when at least two measures of the transaction are more valuable to the business entity, said measures selected from the group consisting of profitability of the transaction to the business entity, the transaction's total revenue amount and at least one parameter indicative of geographical location related to the transaction.

15. The method of claim 1, wherein a ratio between the value of the incentive award and the value of the quantifiable transaction applicable during a predefined initial period of operation of the incentive award program is larger than during subsequent periods.

16. The method of claim 1, wherein a sum of progressively smaller incentive awards provided over all of the periods of operation of the incentive award program asymptotically approaches a limit that represents the total incentive awards provided for all quantifiable transactions.

17. The method of claim 1, wherein the step of providing further comprises the steps of:
 a. receiving funding to enable operation of the incentive award program;
 b. determining an amount of the incentive award;
 c. crediting said amount into a recipient's account;
 d. furnishing periodic statements of account to the recipient; and
 e. cashing-in the incentive award on behalf of the recipient.

18. The method of claim 17, wherein receiving funding comprises receiving income as a fee from at least one fee-paying party, wherein the fee is selected from the group consisting of a fee paid for fights to conduct transactions in a market, a fee paid for rights to conduction transactions in a geographical area, a fee paid for rights to conduct transactions in a medium of commerce, a fee paid for rights to conduct transactions on the Internet, a fee paid per quantifiable transaction, a periodic maintenance fee and a fee paid to defray operating costs of the incentive award program.

19. The method of claim 18, wherein the at least one fee-paying party is selected from the group consisting of the business entity and any transacting party.

20. The method of claim 17, wherein determining an amount of the incentive award further comprises the step of:
 a. apportioning a part of the funding to fund the chosen investment vehicle on behalf of the recipient and crediting the apportioning to the recipient's account.

21. The method of claim 17, wherein determining an amount of the incentive award further comprises the step of:
 a. determining a number of instruments of ownership in the chosen investment vehicle to be issued on behalf of the recipient and crediting said instruments to the recipient's account.

22. The method of claim 21, further comprising the step of:
 a. estimating on a predetermined date a monetary value of the instruments of ownership in recipient's account by multiplying the number of instruments of ownership credited to the account by the unit value of the instruments on the predetermined date.

23. The method of claim 22, wherein the instruments of ownership credited to the account are shares of stock listed on a stock of exchange.

24. The method of claim 17, wherein the cashing-in of the incentive award must occur within a predetermined period after the lapse of a period of time, else the incentive award expires worthless.

25. The method of claim 24, wherein the recipient selects the cashing-in date within the predetermined period.

26. The method of claim 24, wherein the business entity selects the cashing-in date within the predetermined period.

27. The method of claim 17, wherein the cashing-in of the incentive award, wherein the incentive award is in instruments of ownership in an investment vehicle that is equity in the incentive award program, farther comprises the step of:
   a. issuing said instruments; and
   b. selling the issued instruments, whereby said selling provides funds in the amount of a monetary value of the incentive award, and whereby said selling leads to dilution of the unit value of previously issued instruments of equity ownership.

28. The method of claim 27, wherein cashing-in of the incentive award further comprises the steps of:
   a. ascertaining on the date of the cashing-in a value of the investment in the chosen investment vehicle; and
   b. transferring the ascertained value to the recipient and deducting the ascertained value from the balance in recipient's account.

29. A computer based method for carrying out an incentive award program by a business entity through an Internet portal site comprising the steps of:
   a. participating in a quantifiable transaction, the quantifiable transaction having at least two transacting parties and being transacted through an Internet portal site,
   b. determining at least one of the transacting parties to be a recipient of an incentive award offered by the business entity,
   c. choosing as the incentive award an investment vehicle that is equity in the incentive award program,
   d. calculating the incentive award according to the formula:

$F_n = F_1 R^{n-1}$, where
      n is the current period since the onset of carrying out the method;
      $F_1$ is the fraction of ownership rights in the chosen equity provided to the recipient in the first period of carrying out the method;
      $F_n$ is the fraction of ownership rights in the chosen equity provided to the recipient in the current period of carrying out the method;
      R is a multiplier fraction greater than zero and less than one by which the provided fraction of ownership rights changes in successive periods;
   e. providing the chosen incentive award to the recipient, wherein the business entity is selected from the group consisting of the owner of the incentive award program and an authorized operator of the incentive award program.

30. The method of claim 29, wherein the quantifiable transaction is transacted from an incentive award web site on the Internet and wherein the Internet portal site provides exclusive access to the incentive award web sites.

31. The method of claim 30, further comprising the step of:
   a. an authorized operator operating at least one incentive award web site.

32. The method of claim 29, wherein participating is selected from the group consisting of: participating only by carrying out the incentive award program and participating not only by carrying out the incentive award program but additionally as a transacting party.

33. The method of claim 29, wherein the transacting party comprises any entity engaging in a quantifiable transaction, the transaction characterized by the business entity providing an incentive award.

34. The method of claim 29, wherein at least two of the transacting parties are recipients, and wherein a total incentive award for the quantifiable transaction is the sum of all incentive awards provided to each recipient in the transaction, the business entity determining the portion of the total award provided to each recipient.

35. The method of claim 29, wherein at least one of the transacting parties pays a fee to the business entity, said transacting party acting as a supplier to a customer and the customer being provided an incentive award by the business entity.

36. The method of claim 29, wherein determining at least one of the transacting parties to be a recipient comprises the business entity choosing which of the transacting parties in a quantifiable transaction are to be encouraged to engage in the transaction.

37. The method of claim 29, wherein the recipient designates at least one other party to receive at least a part of the recipient's incentive award, said other party comprising any entity.

38. The method of claim 29, wherein the incentive award gets larger as the value of the quantifiable transaction gets larger.

39. The method of claim 29, wherein the value of the quantifiable transaction comprises the total revenue amount of the transaction.

40. The method of claim 38, wherein a larger incentive award is provided when at least two measures of the transaction are more valuable to the business entity, said measures selected from the group consisting of profitability of the transaction to the business entity, the transaction's total revenue amount and at least one parameter indicative of geographical location related to the transaction.

41. The method of claim 29, wherein the investment vehicle that is equity in the incentive award program is selected from the group consisting of options, warrants, restricted stock, shares of common stock, shares of preferred stock and shares of tracking stock.

42. The method of claim 41, wherein a ratio between the amount of the incentive award and the value of the quantifiable transaction remains in effect for a predetermined period of time, and wherein a larger incentive award is provided when at least two measures of the transaction are more valuable to the business entity, said measures selected from the group consisting of profitability of the transaction to the business entity, the transaction's total revenue amount and at least one parameter indicative of geographical location related to the transaction.

43. The method of claim 41, wherein a ratio between the amount of the incentive award and the value of the quantifiable transaction applicable during a predefined initial period of operation of the incentive award program is larger than during subsequent periods.

44. The method of claim 43, wherein the cumulative sum of the progressively smaller incentive awards provided over all of the periods of operation of the incentive award program asymptotically approaches a limit that represents the total incentive awards provided for all quantifiable transactions.

45. The method of claim 29, wherein providing further comprises steps of:
   a. receiving funding to enable operation of the incentive award program;
   b. determining an amount of the incentive award;
   c. crediting said amount into a recipient's account;
   d. furnishing periodic statements of account to the recipient; and
   e. cashing-in the incentive award on behalf of the recipient.

46. The method of claim 45, wherein receiving funding comprises receiving income as a fee from at least one fee-paying party, wherein the fee is selected from the group consisting of a fee paid for rights to conduct transactions in a market, a fee paid for rights to conduction transactions in a geographical area, a fee paid for rights to conduct transactions in a medium of commerce, a fee paid for rights to conduct transactions on the Internet, a fee paid per quantifiable transaction, a periodic maintenance fee and a fee paid to defray operating costs of the incentive award program.

47. The method of claim 46, wherein the at least one fee-paying party is selected from the group consisting of the business entity, and any transacting party.

48. The method of claim 45, wherein determining an amount of the incentive award further comprises the step of:
   a. determining a number of instruments of ownership in the chosen investment vehicle to be designated to the benefit of the recipient and crediting the number of instruments of ownership to the recipient's account.

49. The method of claim 48, further comprising the step of:
   a. estimating on a predetermined date a monetary value of the instruments of ownership in recipient's account by multiplying the number of instruments of ownership credited to the account by the unit value of the instruments on the predetermined date.

50. The method of claim 49, wherein the instruments of ownership credited to the recipient's account are shares of stock listed on a stock exchange.

51. The method of claim 45, wherein the cashing-in of the incentive award must occur within a predetermined period after the lapse of a period of time, else the incentive award expires worthless.

52. The method of claim 45, wherein the cashing-in of the incentive award further comprises the steps of:
   a. issuing instruments of ownership in the value of the entity; and
   b. selling the issued instruments, whereby said selling provides funds in the amount of a monetary value of the incentive award, and whereby said selling leads to dilution of the unit value of previously issued instruments of ownership.

53. The method of claim 52, wherein cashing-in of the incentive award further comprises the steps of:
   a. ascertaining on the date of the cashing-in a value of the investment in the chosen investment vehicle; and
   b. transferring the ascertained value to the recipient; and
   c. deducting the ascertained value from a balance in recipient's account.

54. A computer based method for carrying out an incentive award program by a business entity over a communications network comprising the steps of:
   a. participating in a quantifiable transaction, the quantifiable transaction having at least two transacting parties, and at least part of the quantifiable transaction being transacted on a communications network,
   b. determining at least one of the transacting parties to be a recipient of an incentive award offered by the business entity;
   c. choosing as the incentive award an investment vehicle that is equity in the incentive award program,
   d. calculating the incentive award according to the formula:

$$F_n = F_1 R^{n-1},$$

where
      n is the current period since the onset of carrying out the method;
      $F_1$ is the fraction of ownership rights in the chosen equity provided to the recipient in the first period of carrying out the method;
      $F_n$ is the fraction of ownership rights in the chosen equity provided to the recipient in the current period of carrying out the method;
      R is a multiplier fraction greater than zero and less than one by which the provided fraction of ownership rights changes in successive periods;
   e. providing the chosen incentive award to the recipient,
   f. carrying out steps a–e using at least one computer processor and at least one computer storage means,
   wherein the business entity is selected from the group consisting of the owner of the incentive award program and an authorized operator of the incentive award program.

55. The method of claim 54, wherein the communications network comprises a communications means for conducting at least part of a transaction, wherein the transaction is selected from the group consisting of credit transactions, credit card transactions, debit transactions, debit card transactions, smart card transactions, wire transfer transactions, line of credit transactions, Internet transactions, auctions, reverse auctions and lotteries.

56. The method of claim 55, wherein the communication means for conducting is selected from the group consisting of electronic means, telephonic means, wireless means, general packet radio service means, UMTS means and optical fiber means.

57. The method of claim 56, further comprising the step of the quantifiable transaction being transacted from a web site on the Internet by a transacting party.

58. A computer based method for carrying out an incentive award program by a business entity comprising the steps of:
   a. participating in a quantifiable transaction, the quantifiable transaction having at least two transacting parties,
   b. determining at least one of the transacting parties to be a recipient of an incentive award offered by the business entity,
   c. choosing as the incentive award an investment vehicle that is equity in the incentive award program,
   d. calculating the incentive award according to the formula:

$$F_n = F_1 R^{n-1},$$

where
      n is the current period since the onset of carrying out the method;
      $F_1$ is the fraction of ownership rights in the chosen equity provided to the recipient in the first period of carrying out the method;

$F_n$ is the fraction of ownership rights in the chosen equity provided to the recipient in the current period of carrying out the method;

R is a multiplier fraction greater than zero and less than one by which the provided fraction of ownership rights changes in successive periods;

e. providing the chosen incentive award to the recipient, f. displaying at least one certifying mark, the mark identifying the incentive award program, g. carrying out steps a–e and optionally step f using at least one computer processor and at least one computer storage means, wherein the business entity is selected from the group consisting of the owner of the incentive award program and an authorized operator of the incentive award program.

59. The method of claim 58, wherein the certifying mark comprises two components, each component having an identifying function, wherein a first component identifies the business entity as an entity whose quantifiable transactions provide to recipients investments as incentive awards, and wherein a second component uniquely identifies the business entity with a group consisting of the owner of the incentive award program and authorized operators of the incentive award program.

60. The method of claim 59, wherein the business entity grants a right to use the certifying mark to a transacting party, whereby the mark identifies the transacting party as an entity whose quantifiable transactions provide recipients with incentive awards.

61. A computer based method for carrying out an incentive award program by a business entity through an Internet portal site comprising the steps of:

a. participating in a quantifiable transaction, the quantifiable transaction having at least two transacting parties, and being transacted through an Internet portal site, b. determining at least one of the transacting parties to be a recipient of an incentive award offered by the business entity, c. choosing as the incentive award an investment vehicle that is equity in the incentive award program, d. calculating the incentive award according to the formula:

$$F_n = F_1 R^{n-1},$$

where n is the current period since the onset of carrying out the method;

$F_1$ is the fraction of ownership rights in the chosen equity provided to the recipient in the first period of carrying out the method;

$F_n$ is the fraction of ownership rights in the chosen equity provided to the recipient in the current period of carrying out the method;

R is a multiplier fraction greater than zero and less than one by which the provided fraction of ownership rights changes in successive periods;

e. providing the chosen incentive award to the recipient, f. displaying at least one certifying mark, the mark identifying the incentive award program, wherein the business entity is selected from the group consisting of the owner of the incentive award program and an authorized operator of the incentive award program, wherein the authorized operator has authority to carry out at least in part the incentive award program.

62. The method of claim 61, wherein the certifying mark comprises two components, each component having an identifying function, wherein a first component identifies the business entity as an entity whose quantifiable transactions provide to recipients investments as incentive awards, and wherein a second component uniquely identifies the business entity within a group consisting of the owner of the incentive award program and all authorized operators of the incentive award program.

63. The method of claim 62, wherein the second component uniquely identifies incentive award web sites to which the Internet portal site provides exclusive access.

64. The method of claim 63, wherein the business entity grants a right to use the certifying mark to a transacting party who operates at least one incentive award web site, whereby the mark identifies the transacting party as an entity whose quantifiable transactions provide recipients with incentive awards.

65. A computer based method for carrying out an incentive award program by a business entity comprising the steps of:

a. participating in a quantifiable transaction, the quantifiable transaction having at least two transacting parties, b. determining at least one of the transacting parties to be a recipient of an incentive award offered by the business entity, c. choosing as the incentive award an investment vehicle that is equity in the incentive award program, d. calculating the incentive award according to the formula:

$$F_n = F_1 R^{n-1},$$

where n is the current period since the onset of carrying out the method;

$F_1$ is the fraction of ownership rights in the chosen equity provided to the recipient in the first period of carrying out the method;

$F_n$ is the fraction of ownership rights in the chosen equity provided to the recipient in the current period of carrying out the method;

R is a multiplier fraction greater than zero and less than one by which the provided fraction of ownership rights changes in successive periods;

e. providing the chosen incentive award to the recipient, f. providing at least one transacting party in the quantifiable transaction a chance to win in a lottery the incentive award, and g. carrying out steps a–f using at least one computer processor and at least one computer storage means, wherein the business entity is selected from the group consisting of the owner of the incentive award program and an authorized operator of the incentive award program, wherein the authorized operator has authority to carry out at least in part the incentive award program.

66. A computer based method for carrying out an incentive award program by a business entity through an Internet portal site comprising the steps of:

a. participating in a quantifiable transaction, the quantifiable transaction having at least two transacting parties, and being transacted through an Internet portal site, b. determining at least one of the transacting parties to be a recipient of an incentive award offered by the business entity, c. choosing as the incentive award an investment vehicle that is equity in the incentive award program, d. calculating the incentive award according to the formula:

$$F_n = F_1 R^{n-1},$$

where
- n is the current period since the onset of carrying out the method;
- $F_1$ is the fraction of ownership rights in the chosen equity provided to the recipient in the first period of carrying out the method;
- $F_n$ is the fraction of ownership rights in the chosen equity provided to the recipient in the current period of carrying out the method;
- R is a multiplier fraction greater than zero and less than one by which the provided fraction of ownership rights changes in successive periods;

e. providing the chosen incentive award to the recipient, f. providing at least one transacting party in the quantifiable transaction a chance to win at least one prize in a lottery as an incentive award, the prize being an investment vehicle that is equity in the incentive award program, wherein the business entity is selected from the group consisting of the owner of the incentive award program and an authorized operator of the incentive award program, wherein the authorized operator has authority to carry out at least in part the incentive award program.

67. The method of claim 65 or 66, wherein the chance to win is in proportion to a value of the quantifiable transaction, the value being determined by the business entity.

68. A computer-executed method for implementing an incentive award program by a business entity comprising a computer processor and a computer memory storage device, said method comprising:
   a. inputting into the storage device logic providing an incentive award for each of a plurality of quantifiable transactions;
   b. receiving signals representing data descriptive of a quantifiable transaction for which an incentive award is offered;
   c. determining at least one recipient of the incentive award;
   d. transmitting and receiving signals representing data indicative of a chosen incentive award, wherein the incentive award is an investment vehicle that is equity in the incentive award program,
   e. calculating the incentive award according to the formula:

$$F_n = F_1 R^{n-1},$$

where
- n is the current period since the onset of carrying out the method;
- $F_1$ is the fraction of ownership rights in the chosen equity provided to the recipient in the first period of carrying out the method;
- $F_n$ is the fraction of ownership rights in the chosen equity provided to the recipient in the current period of carrying out the method;
- R is a multiplier fraction greater than zero and less than one by which the provided fraction of ownership rights changes in successive periods;

e. providing the incentive award, and f. cashing-in the incentive award, wherein the business entity is selected from the group consisting of the owner of the incentive award program and an authorized operator of the incentive award program, wherein the authorized operator has authority to carry out at least in part the incentive award program.

69. The method of claim 68, wherein determining at least one recipient comprises analyzing data descriptive of the quantifiable transaction using the logic stored in the storage device.

70. The method of claim 68, wherein transmitting and receiving signals indicative of choosing comprises:
   a. furnishing recipient with data indicative of the offered investment;
   b. processing signals representing data descriptive of the offered investment using the logic stored in the storage device, said processing providing a result, wherein said result comprises a calculation of an amount of the incentive award;
   c. storing the result in a database in the storage device, wherein said storing causes an account to be created on behalf of the recipient.

71. The method of claim 68, wherein providing the incentive award comprises:
   a. calculating an amount of the award in the chosen investment using the logic stored in the storage device and the stored result,
   b. crediting the amount of the award into the recipient's account;
   c. transmitting signals periodically to the recipient, said signals representing data descriptive of a periodic statement of the recipient's account.

72. The method of claim 68, wherein cashing-in the incentive award comprises,
   a. determining from the stored logic and the stored result that a balance in the account is eligible to be disbursed;
   b. conveying to the recipient the monetary value of the balance in the account.

73. The method of claim 68, wherein cashing-in the incentive award comprises using stored logic, and the stored result:
   a. determining from the stored logic and the stored result that a balance in the account is eligible to be disbursed;
   b. issuing instruments of ownership in an investment vehicle that is equity in the incentive award program;
   c. selling the issued instruments of ownership;
   d. conveying to the recipient the monetary value of the sold instruments in an amount equal to recipient's balance in the account.

74. An apparatus for carrying out an incentive award program by a business entity, the apparatus comprising:
   a. a computer memory storage device;
   b. a computer processor connected to the storage device;
   c. the storage device storing a program for controlling the processor,
   d. and the processor operative with the program to perform the steps of:
   e. participating in a quantifiable transaction, said transaction having at least two transacting parties,
   f. determining at least one of the transacting parties to be a recipient of an incentive award offered by the business entity, the incentive award comprising at least one investment chosen from a plurality of vehicles for investment,
   g. choosing as the incentive award an investment vehicle that is equity in the incentive award program,
   h. calculating the incentive award according to the formula:

$$F_n = F_1 R^{n-1},$$

where
- n is the current period since the onset of carrying out the method;
- $F_1$ is the fraction of ownership rights in the chosen equity provided to the recipient in the first period of carrying out the method;
- $F_n$ is the fraction of ownership rights in the chosen equity provided to the recipient in the current period of carrying out the method;
- R is a multiplier fraction greater than zero and less than one by which the provided fraction of ownership rights changes in successive periods;

i. providing the chosen incentive award to the recipient, wherein the business entity is selected from the group consisting of the owner of the incentive award program and an authorized operator of the incentive award program, wherein at least one authorized operator is carrying out at least in part the incentive award program.

75. The apparatus of claim 74, wherein participating is selected from the group consisting of: participating only by carrying out the incentive award program and participating not only by carrying out the incentive award program but additionally as a transacting party.

76. The apparatus of claim 74, wherein the transacting party comprises any entity engaging in a quantifiable transaction, the transaction characterized by the business entity providing an incentive award.

77. The apparatus of claim 74, wherein at least two of the transacting parties are recipients, and wherein a total incentive award for the quantifiable transaction is the sum of all incentive awards provided to each recipient in the transaction, the business entity determining the portion of the total award provided to each recipient.

78. The apparatus of claim 74, wherein at least one of the transacting parties pays a fee to the business entity, the transacting party acting as a supplier to a customer and the customer being provided an incentive award by the business entity.

79. The apparatus of claim 78, wherein at least one real estate agent becomes a transacting party by paying a fee to the business entity, and wherein the business entity provides the incentive award to at least one recipient, the at least one recipient being selected from the group consisting of the seller of the property, the buyer of the property, the lessor of the property, the lessee of the property, the real estate agent for the seller, the real estate agent finding the buyer, the real estate agency listing the property, the multiple listing service provider, the real estate agency with which the agent finding the buyer is affiliate, and the real estate agency with which the agent representing the seller is affiliated.

80. The apparatus of claim 74, wherein determining at least one of the transacting parties to be a recipient comprises the business entity choosing which of the transacting parties are to be encouraged to engage in the quantifiable transaction.

81. The apparatus of claim 74, wherein the recipient designates at least one other party to receive at least a part of the recipient's incentive award, said other party comprising any entity.

82. The apparatus of claim 74, wherein the investment vehicle that is equity in the incentive award program is selected from the group consisting of options, warrants, restricted stock, shares of common stock, shares of preferred stock and shares of tracking stock.

83. The apparatus of claim 74, wherein the incentive award gets larger as the value of the quantifiable transaction gets larger.

84. The apparatus of claim 74, wherein the value of the quantifiable transaction comprises the total revenue amount of the transaction.

85. The apparatus of claim 74, wherein a larger incentive award is provided when at least two measures of the transaction are more valuable to the business entity, said measures selected from the group consisting of profitability of the transaction to the business entity, the transaction's total revenue amount and at least one parameter indicative of geographical location related to the transaction.

86. The apparatus of claim 74, wherein the amount of the incentive award is based upon the value of the transaction for which the award is granted, said transaction occurring within a predefined period, relative to the total value of all transactions for which incentive awards were awarded during the predefined period.

87. The apparatus of claim 74, wherein a ratio between the value of the incentive award and the value of the quantifiable transaction remains in effect for a predefined period of time, and wherein a larger incentive award is provided when at least two measures of the transaction are more valuable to the business entity, said measures selected from the group consisting of profitability of the transaction to the business entity, the transaction's total revenue amount and at least one parameter indicative of geographical location related to the transaction.

88. The apparatus of claim 74, where a ratio between the amount of the incentive award and the value of the quantifiable transaction applicable during a predefined initial period of operation of the incentive award program is larger than during subsequent periods.

89. The apparatus of claim 74, wherein a sum of progressively smaller incentive awards provided over all of the periods of operation of the incentive award program asymptotically approaches a limit that represents the total incentive awards provided for all quantifiable transactions.

90. The apparatus of claim 74, wherein the step of providing further comprises the steps of:
   a. receiving finding to enable operation of the incentive award program;
   b. determining an amount of the incentive award;
   c. crediting said amount into a recipient's account;
   d. furnishing periodic statements of account to the recipient; and
   e. cashing-in the incentive award on behalf of the recipient.

91. The apparatus of claim 90, wherein the receiving funding comprises receiving income as a fee from at least one fee-paying party, wherein the fee is selected from the group consisting of a fee paid for rights to conduct transactions in a market, a fee paid for rights to conduct transactions in a geographical area, a fee paid for rights to conduct transactions in a medium of commerce, a fee paid for rights to conduct transactions on the Internet, a fee paid per quantifiable transaction, a periodic maintenance fee and a fee paid to defray operating costs of the incentive award program.

92. The apparatus of claim 91, wherein the at least one fee-paying party is selected from the group consisting of the business entity and any transacting party.

93. The apparatus of claim 90, wherein determining an amount of the incentive award further comprises the step of:
   a. determining a number of instruments of ownership in the chosen investment vehicle to be issued on behalf of the recipient and crediting them to the recipient's account.

94. The apparatus of claim 93, further comprising the step of:
   a. estimating on a predetermined date a monetary value of recipient's account by multiplying the number of instruments of ownership credited to the account by the unit value of said instruments on the predetermined date.

95. The apparatus of claim 94, wherein the instruments of ownership credited to the account are shares of stock listed on a stock exchange.

96. The apparatus of claim 90, wherein the cashing-in of the incentive award must occur within a predetermined period after the lapse of a period of time, else the incentive award expires worthless.

97. The apparatus of claim 96, wherein the recipient selects the cashing-in date within the predetermined period.

98. The apparatus of claim 96, wherein the business entity selects the cashing-in date within the predetermined period.

99. The apparatus of claim 90, wherein the cashing-in of the incentive award, wherein the incentive award is further comprises the step of:
   a. issuing said instruments; and
   b. selling the issued instruments, whereby said selling provides funds in the amount of a monetary value of the incentive award, and whereby said selling leads to dilution of the unit value of previously issued instruments of equity ownership.

100. The apparatus of claim 99, wherein cashing-in of the incentive award further comprises the steps of:
   a. ascertaining on the date of the cashing-in a value of the chosen investment; and
   b. transferring the ascertained value to the recipient and deducting the ascertained value from the balance in recipient's account.

101. An apparatus for carrying out an incentive award program by a business entity, through an Internet portal site, the apparatus comprising:
   a. a computer memory storage device;
   b. a computer process operated by the business entity and connected to the storage device;
   c. the storage device storing a program for controlling the processor;
   d. and the processor operative with the program to perform the steps of;
   e. participating in a quantifiable transaction, the quantifiable transaction having at least two transacting parties and being transacted through an Internet portal site,
   f. determining at least one of the transacting parties to be a recipient of an incentive award offered by the business entity,
   g. choosing as the incentive award an investment vehicle that is equity in the incentive award program,
   h. calculating the incentive award according to the formula:

$F_n = F_1 R^{n-1}$, where
      n is the current period since the onset of carrying out the method;
      $F_1$ is the fraction of ownership rights in the chosen equity provided to the recipient in the first period of carrying out the method;
      $F_n$ is the fraction of ownership rights in the chosen equity provided to the recipient in the current period of carrying out the method;
      R is a multiplier fraction greater than zero and less than one by which the provided fraction of ownership rights changes in successive periods;
   i. providing the chosen incentive award to the recipient, wherein the business entity is selected from the group consisting of the owner of the incentive award program and an authorized operator of the incentive award program, wherein the authorized operator has authority to carry out at least in part the incentive award program.

102. The apparatus of claim 101, wherein the quantifiable transaction is transacted from an incentive award web site on the Internet and wherein the Internet portal site provides exclusive access to the incentive award web sites.

103. The apparatus of claim 101, further comprising the step of:
   a. an authorized operator operating at least one incentive award web site.

104. An apparatus for carrying out an incentive award program by a business entity over a communications network, the apparatus comprising:
   a. a computer memory storage device; and
   b. a computer processor connected to the storage device;
   c. the storage device storing a program for controlling the processor, and
   d. the processor operative with the program to perform the steps of:
   e. participating in a quantifiable transaction, the quantifiable transaction having at least two transacting parties, and at least part of the quantifiable transaction being transacted on a communications network,
   f. determining at least one of the transacting parties to be a recipient of an incentive award offered by the business entity,
   g. choosing as the incentive award an investment vehicle that is equity in the incentive award program,
   h. calculating the incentive award according to the formula:

$F_n = F_1 R^{n-1}$, where
      n is the current period since the onset of carrying out the method;
      $F_1$ is the fraction of ownership rights in the chosen equity provided to the recipient in the first period of carrying out the method;
      $F_n$ is the fraction of ownership rights in the chosen equity provided to the recipient in the current period of carrying out the method;
      R is a multiplier fraction greater than zero and less than one by which the provided fraction of ownership rights changes in successive periods;
   i. providing the chosen incentive award to the recipient, wherein the business entity is selected from the group consisting of the owner of the incentive award program and an authorized operator of the incentive award program, wherein the authorized operator has authority to carry out at least in part the incentive award program, and wherein the communications network comprises a communication means for conducting a transaction, wherein the transaction is selected from the group consisting of credit transactions, credit card transactions, debit transactions, debit card transactions, smart card transactions, wire transfer transactions, line of credit transactions, Internet transactions, auctions, reverse auctions and lotteries.

105. The apparatus of claim 104, wherein the communication means for conducting is selected from the group consisting of electronic means, telephonic means, wireless means, general packet radio service means, UMTS means and optical fiber means.

106. The apparatus of claim 105, further comprising the step of the quantifiable transaction being transacted from a web site on the Internet by a transacting party.

107. An apparatus for carrying out an incentive award program by a business entity, the apparatus comprising:
  a. a computer memory storage device;
  b. a computer processor operated by the business entity and connected to the storage device;
  c. the storage device storing a program for controlling the processor,
  d. and the processor operative with the program to perform the steps of:
  e. participating in a quantifiable transaction, the quantifiable transaction having at least two transacting parties,
  f. determining at least one of the transacting parties to be a recipient of an incentive award offered by the business entity, the incentive award comprising at least one investment chosen from a plurality of vehicles for investment,
  g. choosing as the incentive award an investment vehicle that is equity in the incentive award program,
  h. calculating the incentive award according to the formula:

$$F_n = F_1 R^{n-1},$$

where
  n is the current period since the onset of carrying out the method;
  $F_1$ is the fraction of ownership rights in the chosen equity provided to the recipient in the first period of carrying out the method;
  $F_n$ is the fraction of ownership rights in the chosen equity provided to the recipient in the current period of carrying out the method;
  R is a multiplier fraction greater than zero and less than one by which the provided fraction of ownership rights changes in successive periods;
  i. providing the chosen incentive award to the recipient,
  j. displaying at least one certifying mark, the mark identifying the incentive award program,
wherein the business entity is selected from the group consisting of the owner of the incentive award program and an authorized operator of the incentive award program, wherein the authorized operator has authority to carry out at least in part the incentive award program.

108. An apparatus for carrying out an incentive award program by a business entity, the apparatus comprising:
  a. a computer memory storage device;
  b. a computer processor operated by the business entity and connected to the storage device;
  c. the storage device storing a program for controlling the processor,
  d. and the processor operative with the program to perform the steps of:
  e. participating in a quantifiable transaction, the quantifiable transaction having at least two transacting parties,
  f. determining at least one of the transacting parties to be a recipient of an incentive award offered by the business entity, the incentive award comprising at least one investment chosen from a plurality of vehicles for investment,
  g. choosing as the incentive award an investment vehicle that is equity in the incentive award program,
  h. calculating the incentive award according to the formula:

$$F_n = F_1 R^{n-1},$$

where
  n is the current period since the onset of carrying out the method;
  $F_1$ is the fraction of ownership rights in the chosen equity provided to the recipient in the first period of carrying out the method;
  $F_n$ is the fraction of ownership rights in the chosen equity provided to the recipient in the current period of carrying out the method;
  R is a multiplier fraction greater than zero and less than one by which the provided fraction of ownership rights changes in successive periods;
  i. providing the chosen incentive award to the recipient,
  j. providing at least one transacting party in the quantifiable transaction a chance in a lottery the incentive award,
wherein the business entity is selected from the group consisting of the owner of the incentive award program and an authorized operator of the incentive award program, wherein the authorized operator has authority to carry out at least in part the incentive award program.

109. An apparatus for implementing an incentive award program carried out by a business entity, the apparatus comprising:
  a. a computer memory storage device;
  b. a computer processor operated by the business entity and connected to the storage device;
  c. the storage device storing a program for controlling the processor,
  d. and the processor operative with the program to perform the steps of:
  e. inputting into the storage device logic comprising terms and conditions for providing an incentive award for each of a plurality of quantifiable transactions;
  f. receiving signals representing data descriptive of a quantifiable transaction for which an incentive award is offered;
  g. determining at least one recipient of the incentive award;
  h. transmitting and receiving signals representing data indicative of a chosen incentive award, wherein the incentive award is an investment vehicle that is equity in the incentive award program;
  i. calculating the incentive award according to the formula:

$$F_n = F_1 R^{n-1},$$

where
  n is the current period since the onset of carrying out the method;
  $F_1$ is the fraction of ownership rights in the chosen equity provided to the recipient in the first period of carrying out the method;
  $F_n$ is the fraction of ownership rights in the chosen equity provided to the recipient in the current period of carrying out the method;
  R is a multiplier fraction greater than zero and less than one by which the provided fraction of ownership rights changes in successive periods;
  j. providing the incentive award, and
  k. cashing-in the incentive award,
wherein the business entity is selected from the group consisting of the owner of the incentive award program and an authorized operator of the incentive award program, wherein the authorized operator has authority to carry out at least in part the incentive award program.

* * * * *